(12) United States Patent
Hosseini et al.

(10) Patent No.: US 10,985,948 B2
(45) Date of Patent: Apr. 20, 2021

(54) NOISE AND INTERFERENCE ESTIMATION IN WIRELESS SYSTEMS USING MULTIPLE TRANSMISSION TIME INTERVALS

(71) Applicant: QUALCOMM Incorporated, San Diego, CA (US)

(72) Inventors: Seyedkianoush Hosseini, San Diego, CA (US); Wanshi Chen, San Diego, CA (US); Juan Montojo, San Diego, CA (US); Shimman Arvind Patel, San Diego, CA (US); Hao Xu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 15/441,092

(22) Filed: Feb. 23, 2017

(65) Prior Publication Data

US 2017/0264466 A1 Sep. 14, 2017

Related U.S. Application Data

(60) Provisional application No. 62/307,293, filed on Mar. 11, 2016.

(51) Int. Cl.
*H04L 25/02* (2006.01)
*H04J 11/00* (2006.01)
(Continued)

(52) U.S. Cl.
CPC ....... *H04L 25/0256* (2013.01); *H04B 1/1036* (2013.01); *H04B 17/345* (2015.01);
(Continued)

(58) Field of Classification Search
CPC . H04L 25/0256; H04L 25/22; H04L 25/0236; H04L 25/03159; H04L 25/2601; H04L 27/2601; H04B 17/345
See application file for complete search history.

(56) References Cited

U.S. PATENT DOCUMENTS 8,599,976 B2 * 12/2013 Gomadam ........... H04B 7/0413
375/299
9,131,498 B2 9/2015 Au et al.
(Continued)

FOREIGN PATENT DOCUMENTS

WO WO-2016032632 A1 3/2016
WO WO-2016126398 A1 8/2016

OTHER PUBLICATIONS

ISA/EP, International Search Report and Written Opinion of the International Searching Authority, Int'l Application No. PCT/US2017/021851, dated May 23, 2017, European Patent Office, Rijswijk, NL, 15 pgs.

*Primary Examiner* — Jeffrey M Rutkowski
*Assistant Examiner* — Jasper Kwoh
(74) *Attorney, Agent, or Firm* — Holland & Hart LLP

(57) ABSTRACT

Noise and interference may be estimated at a user equipment (UE) in a system that may support transmissions having different transmission time intervals (TTIs). The UE may perform a channel estimation for a first set of transmissions having a first TTI based at least in part on an estimated interference from a second set of transmissions having a second TTI that is shorter than the first TTI. The UE may perform channel estimation for orthogonal frequency division multiplexing (OFDM) symbols of the first set of transmissions. The first set of transmissions may then be demodulated based at least in part on the channel estimation for the first set of transmissions. Noise and interference may also be estimated based on one or more null tones within one or more OFDM symbols of the allocated resources.

30 Claims, 23 Drawing Sheets

(51) Int. Cl.
  *H04B 1/10*      (2006.01)
  *H04L 25/03*     (2006.01)
  *H04B 17/345*    (2015.01)
  *H04L 5/00*      (2006.01)
  *H04L 27/26*     (2006.01)

(52) U.S. Cl.
  CPC ........... *H04J 11/004* (2013.01); *H04J 11/005* (2013.01); *H04L 5/0048* (2013.01); *H04L 25/021* (2013.01); *H04L 25/022* (2013.01); *H04L 25/0236* (2013.01); *H04L 25/03159* (2013.01); *H04L 27/2601* (2013.01)

(56) References Cited

U.S. PATENT DOCUMENTS

| | | | | |
|---|---|---|---|---|
| 2003/0076877 A1* | 4/2003 | Nakamura | ............ | H04B 1/707 375/150 |
| 2005/0018641 A1* | 1/2005 | Zhao | ............ | H04B 1/7117 370/342 |
| 2005/0037712 A1* | 2/2005 | Rainbolt | ............ | H04B 17/345 455/67.11 |
| 2007/0030914 A1* | 2/2007 | Ding | ............ | H04L 25/024 375/260 |
| 2009/0019169 A1* | 1/2009 | Li | ............ | H04L 1/20 709/228 |
| 2010/0309801 A1* | 12/2010 | Jongren | ............ | H04L 5/0023 370/252 |
| 2010/0309861 A1* | 12/2010 | Gorokhov | ............ | H04B 1/7103 370/329 |
| 2013/0142062 A1* | 6/2013 | Dinan | ............ | H04W 24/00 370/252 |
| 2013/0322376 A1* | 12/2013 | Marinier | ............ | H04B 17/24 370/329 |
| 2014/0105333 A1* | 4/2014 | Kim | ............ | H04L 1/0054 375/341 |
| 2014/0254419 A1* | 9/2014 | Chun | ............ | H04B 7/024 370/252 |
| 2014/0256341 A1* | 9/2014 | Nayeb Nazar | ............ | H04J 11/0023 455/452.1 |
| 2015/0056931 A1 | 2/2015 | Yerramalli et al. | | |
| 2015/0092582 A1* | 4/2015 | Liao | ............ | H04J 11/005 370/252 |
| 2015/0334685 A1* | 11/2015 | Ji | ............ | H04W 72/1247 370/330 |
| 2015/0373724 A1* | 12/2015 | Ibrahim | ............ | H04W 24/08 370/252 |
| 2016/0127093 A1 | 5/2016 | Jiang et al. | | |
| 2016/0143030 A1* | 5/2016 | Lee | ............ | H04L 5/00 370/329 |
| 2016/0234857 A1 | 8/2016 | Chen et al. | | |
| 2016/0295584 A1 | 10/2016 | Chen et al. | | |
| 2017/0013618 A1 | 1/2017 | Shin | | |
| 2017/0134109 A1* | 5/2017 | Hwang | ............ | H04J 11/0033 |
| 2017/0207898 A1* | 7/2017 | Yang | ............ | H04L 5/0073 |
| 2018/0316537 A1* | 11/2018 | Haghighat | ............ | H04L 5/0073 |

* cited by examiner

NOISE AND INTERFERENCE ESTIMATION IN WIRELESS SYSTEMS USING MULTIPLE TRANSMISSION TIME INTERVALS

CROSS REFERENCES

The present Application for Patent claims priority to U.S. Provisional Patent Application No. 62/307,293 entitled "Noise and Interference Estimation In Wireless Systems Using Multiple Transmission Time Intervals," filed Mar. 11, 2016, assigned to the assignee hereof.

BACKGROUND

The following relates generally to wireless communication and more specifically to noise and interference estimation in systems using multiple transmission time intervals (TTIs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some cases, a wireless device may be configured for low latency communications, which also may be referred to as ultra-low latency (ULL) communications. That is, the device may communicate using a TTI that is shorter in duration relative to other TTIs in the system, which may reduce the time between transmissions. In some situations, system latency may be reduced in low latency systems through a reduced time period for receiving communications, indicating successful or unsuccessful receipt of the communications, and retransmission of any unsuccessfully received communications.

In some cases, certain UEs may receive low latency communications while other UEs may receive non-low latency communications. In cases where low latency and non-low latency communications overlap with each other, the low latency communications may result in interference with the non-low latency communications. Furthermore, in systems that operate using a shared radio frequency spectrum band, communications from other radio access technologies, such as Wi-Fi transmissions, also may result in interference with the non-low latency communications.

SUMMARY

The described techniques relate to improved methods, systems, devices, or apparatuses for interference estimation in systems that employ low latency communications. A user equipment (UE) may be allocated resources for receiving a first set of transmissions that are intended for reception at the UE, and that are transmitted from a first base station using a first transmission time interval (TTI). The UE may also identify a second TTI that may be used for low latency transmissions, transmitted by the first base station or a different base station that may also be received at the UE, where the first TTI has a longer duration than the second TTI. The UE may perform a channel estimation for the first set of transmissions based at least in part on an estimated interference from the low latency transmissions. In some examples, the estimated interference may also, or alternatively, include interference from other wireless sources, such as a Wi-Fi transmitter. The UE may perform channel estimation for each of two or more orthogonal frequency division multiplexing (OFDM) symbols of the first set of transmissions. The first set of transmissions may then be demodulated based at least in part on the channel estimation for the first set of transmissions.

In some examples, the base station may configure one or more null tones within one or more OFDM symbols of the allocated resources. Such null tones may be used by the UE to estimate interference on the first set of transmissions from the low latency transmissions, or other wireless transmissions, based at least in part on signals received during the one or more null tones. The locations of the null tones may be configured by the base station within the allocated resources based at least in part on a location of the allocated resources relative to a second set of wireless resources associated with the low latency transmissions. Signaling for the location of null tones may be provided in semi-static or dynamic indications of the null tone locations.

A method of wireless communication is described in one aspect of the disclosure. The method may include identifying a first TTI for reception of a first set of transmissions and a second TTI for reception of a second set of transmissions, wherein the first TTI has a longer duration than the second TTI. The method may additionally include receiving the first and second sets of transmissions, performing a channel estimation for the first set of transmissions based at least in part on an estimated interference from the second set of transmissions for OFDM symbols of the first set of transmissions, and demodulating the first set of transmissions based at least in part on the channel estimation for the first set of transmissions.

An apparatus for wireless communication is described. The apparatus may include means for identifying a first TTI for reception of a first set of transmissions and a second TTI for reception of a second set of transmissions, wherein the first TTI has a longer duration than the second TTI. The apparatus may also include means for receiving the first and second sets of transmissions, means for performing a channel estimation for the first set of transmissions based at least in part on an estimated interference from the second set of transmissions for OFDM symbols of the first set of transmissions, and means for demodulating the first set of transmissions based at least in part on the channel estimation for the first set of transmissions.

A further apparatus is described. The apparatus may include a processor, memory in electronic communication with the processor, and instructions stored in the memory. The instructions may be operable to cause the processor to identify a first TTI for reception of a first set of transmissions and a second TTI for reception of a second set of transmissions, wherein the first TTI has a longer duration than the second TTI. The instructions may be further operable to receive the first and second sets of transmissions, perform a channel estimation for the first set of transmissions based at least in part on an estimated interference from the second set of transmissions for OFDM symbols of the first set of transmissions, and demodulate the first set of transmissions based at least in part on the channel estimation for the first set of transmissions.

A non-transitory computer-readable medium for wireless communication is described. The non-transitory computer-readable medium may include instructions to cause a processor to identify a first TTI for reception of a first set of transmissions and a second TTI for reception of a second set of transmissions, where the first TTI has a longer duration than the second TTI. The non-transitory computer-readable medium may include further instructions to receive the first and second sets of transmissions, perform a channel estimation for the first set of transmissions based on an estimated interference from the second set of transmissions for OFDM symbols of the first set of transmissions, and demodulate the first set of transmissions based on the channel estimation for the first set of transmissions.

Some examples of the method, apparatus, and non-transitory computer-readable medium described above may further include processes, features, means, or instructions for updating the estimated interference based at least in part on at least one of the received first set of transmissions, the channel estimation, or the demodulated first set of transmissions, or any combination thereof.

Some examples of the method, apparatus, and non-transitory computer-readable medium described above may further include processes, features, means, or instructions for receiving, in the first set of transmissions, a demodulation reference signal (DMRS) tone, a cell-specific reference signal (CRS) tone, or a combination thereof. Some examples of the method, apparatus, and non-transitory computer-readable medium described above may further include processes, features, means, or instructions for determining that the second set of transmissions may be received over different OFDM symbols than the DMRS tone, the CRS tone, or the combination thereof.

Some examples of the method, apparatus, and non-transitory computer-readable medium described above may further include processes, features, means, or instructions for estimating interference for the OFDM symbols of the first set of transmissions based at least in part on one or more reference signals received in the OFDM symbols.

Some examples of the method, apparatus, and non-transitory computer-readable medium described above may further include processes, features, means, or instructions for determining an average power for the OFDM symbols. Some examples of the method, apparatus, and non-transitory computer-readable medium described above may further include processes, features, means, or instructions for determining a covariance of interference for the OFDM symbols based at least in part on the average power for the OFDM symbols.

In some examples of the method, apparatus, and non-transitory computer-readable medium described above, performing the channel estimation further includes performing a minimum mean squared error (MMSE) channel estimation for the first set of transmissions based at least in part on the estimated interference for the OFDM symbols and the one or more reference signals transmitted in the OFDM symbols.

In some examples of the method, apparatus, and non-transitory computer-readable medium described above, the first set of transmissions may be demodulated using a MMSE demodulation for the first set of transmissions based at least in part on the MMSE channel estimation for each of the OFDM symbols.

In some examples of the method, apparatus, and non-transitory computer-readable medium described above, the estimated interference may be averaged over two or more resource blocks (RBs) of the first set of transmissions.

A method of wireless communication is described in another aspect of the disclosure. The method may include identifying a first TTI for transmission of a first set of transmissions and a second TTI for transmission of a second set of transmissions. The second set of transmissions may overlap with at least a portion of OFDM symbols of the first set of transmissions, and the first TTI may have a longer duration than the second TTI. The method may further include transmitting the first set of transmissions using a transmission mode that supports interference estimation of the second set of transmissions for the OFDM symbols of the first set of transmissions.

An apparatus for wireless communication is described. The apparatus may include means for identifying a first TTI for transmission of a first set of transmissions and means for identifying a second TTI for transmission of a second set of transmissions. The second set of transmissions may overlap with at least a portion of OFDM symbols of the first set of transmissions, and the first TTI may have a longer duration than the second TTI. The apparatus may further include means for transmitting the first set of transmissions using a transmission mode that supports interference estimation of the second set of transmissions for the OFDM symbols of the first set of transmissions.

A further apparatus is described. The apparatus may include a processor, memory in electronic communication with the processor, and instructions stored in the memory. The instructions may be operable to cause the processor to identify a first TTI for transmission of a first set of transmissions and a second TTI for transmission of a second set of transmissions. The second set of transmissions may overlap with at least a portion of OFDM symbols of the first set of transmissions, and the first TTI may have a longer duration than the second TTI. The instructions may be further operable to transmit the first set of transmissions using a transmission mode that supports interference estimation of the second set of transmissions for the OFDM symbols of the first set of transmissions.

A non-transitory computer-readable medium for wireless communication is described. The non-transitory computer-readable medium may include instructions to cause a processor to identify a first TTI for transmission of a first set of transmissions and a second TTI for transmission of a second set of transmissions. The second set of transmissions may overlap with at least a portion of OFDM symbols of the first set of transmissions, and the first TTI may have a longer duration than the second TTI. The non-transitory computer-readable medium may further include instructions to transmit the first set of transmissions using a transmission mode that supports interference estimation of the second set of transmissions for the OFDM symbols of the first set of transmissions.

A method of wireless communication is described in a further aspect of the disclosure. The method may include identifying a first TTI for reception of a first set of transmissions and a second TTI for reception of a second set of transmissions, wherein the first TTI has a longer duration than the second TTI. The method may also include identifying one or more null tones within one or more OFDM symbols of a first set of wireless resources associated with the first set of transmissions based at least in part on a location of the first set of wireless resources relative to a second set of wireless resources associated with the second set of transmissions. The method may further include receiving the first and second sets of transmissions and estimating interference on the first set of transmissions from the second set of transmissions based at least in part on signals received during the one or more null tones.

An apparatus for wireless communication is described. The apparatus may include means for identifying a first TTI for reception of a first set of transmissions and a second TTI for reception of a second set of transmissions, wherein the first TTI has a longer duration than the second TTI. The apparatus may also include means for identifying one or more null tones within one or more OFDM symbols of a first set of wireless resources associated with the first set of transmissions based at least in part on a location of the first set of wireless resources relative to a second set of wireless resources associated with the second set of transmissions. The apparatus may further include means for receiving the first and second sets of transmissions and means for estimating interference on the first set of transmissions from the second set of transmissions based at least in part on signals received during the one or more null tones.

A further apparatus is described. The apparatus may include a processor, memory in electronic communication with the processor, and instructions stored in the memory. The instructions may be operable to cause the processor to identify a first TTI for reception of a first set of transmissions and a second TTI for reception of a second set of transmissions, wherein the first TTI has a longer duration than the second TTI. The instructions may also be operable to identify one or more null tones within one or more OFDM symbols of a first set of wireless resources associated with the first set of transmissions based at least in part on a location of the first set of wireless resources relative to a second set of wireless resources associated with the second set of transmissions. The instructions may be further operable to receive the first and second sets of transmissions and estimate interference on the first set of transmissions from the second set of transmissions based at least in part on signals received during the one or more null tones.

A non-transitory computer-readable medium for wireless communication is described. The non-transitory computer-readable medium may include instructions to cause a processor to identify a first TTI for reception of a first set of transmissions and a second TTI for reception of a second set of transmissions, where the first TTI has a longer duration than the second TTI. The non-transitory computer-readable medium may also include instructions to identify one or more null tones within one or more OFDM symbols of a first set of wireless resources associated with the first set of transmissions based on a location of the first set of wireless resources relative to a second set of wireless resources associated with the second set of transmissions. The non-transitory computer-readable medium may further include instructions to receive the first and second sets of transmissions and estimate interference on the first set of transmissions from the second set of transmissions based on signals received during the one or more null tones.

A method of wireless communication is described in yet another aspect of the disclosure. The method may include identifying a first TTI for reception of a first set of transmissions and a second TTI for reception of a second set of transmissions, wherein the first TTI has a longer duration than the second TTI. The method may also include configuring one or more null tones within one or more OFDM symbols of a first set of wireless resources associated with the first set of transmissions based at least in part on a location of the first set of wireless resources relative to a second set of wireless resources associated with the second set of transmissions and transmitting the first set of transmissions using the first set of wireless resources configured with the one or more null tones.

An apparatus for wireless communication is described. The apparatus may include means for identifying a first TTI for reception of a first set of transmissions and a second TTI for reception of a second set of transmissions, wherein the first TTI has a longer duration than the second TTI. The apparatus may also include means for configuring one or more null tones within one or more OFDM symbols of a first set of wireless resources associated with the first set of transmissions based at least in part on a location of the first set of wireless resources relative to a second set of wireless resources associated with the second set of transmissions and means for transmitting the first set of transmissions using the first set of wireless resources configured with the one or more null tones.

A further apparatus is described. The apparatus may include a processor, memory in electronic communication with the processor, and instructions stored in the memory. The instructions may be operable to cause the processor to identify a first TTI for reception of a first set of transmissions and a second TTI for reception of a second set of transmissions, wherein the first TTI has a longer duration than the second TTI. The instructions may be further operable to configure one or more null tones within one or more OFDM symbols of a first set of wireless resources associated with the first set of transmissions based at least in part on a location of the first set of wireless resources relative to a second set of wireless resources associated with the second set of transmissions and transmit the first set of transmissions using the first set of wireless resources configured with the one or more null tones.

A non-transitory computer-readable medium for wireless communication is described. The non-transitory computer-readable medium may include instructions to cause a processor to identify a first TTI for reception of a first set of transmissions and a second TTI for reception of a second set of transmissions, where the first TTI has a longer duration than the second TTI. The non-transitory computer-readable medium may include further instructions to configure one or more null tones within one or more OFDM symbols of a first set of wireless resources associated with the first set of transmissions based on a location of the first set of wireless resources relative to a second set of wireless resources associated with the second set of transmissions and transmit the first set of transmissions using the first set of wireless resources configured with the one or more null tones.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

A wireless system may utilize low latency communications, also referred to as ultra-low latency (ULL) communications, to increase the throughput of a communication link and to support latency-intolerant communications. Low latency communications may utilize transmission time intervals (TTIs) that are shorter than 1 ms, which may reduce latency and provide increased scheduling flexibility of systems that employ such techniques. A wireless system that utilizes both low latency communications and non-low latency communications (e.g., communications with a 1 ms TTI) may experience low latency interference during non-low latency operations. Therefore, a receiving device, such as a receiving user equipment (UE), may detect low latency interference to mitigate potentially deleterious effects associated with low latency communications. Since a non-low latency transmission may, for example, be scheduled at the beginning of a 1 ms subframe, while low latency traffic may be scheduled on a per symbol basis, the receiving device may not have prior knowledge of low latency traffic.

According to some techniques provided herein, a receiving device may estimate interference for received non-low latency communications on a per-symbol basis for two or more orthogonal frequency division multiplexing (OFDM) symbols. This estimate of interference may be used to perform a channel estimation that may be used to demodulate received signals. The receiving device may iteratively perform channel estimation based on an updated noise and interference estimate based on a difference between the demodulated signal and the prior estimated channel.

In some examples, a base station may configure one or more null tones within one or more OFDM symbols of the allocated resources. Such null tones may be used to estimate interference on the first set of transmissions from the low latency transmissions, or other wireless transmissions, based at least in part on signals received during the one or more null tones. The locations of the null tones may be configured by the base station within the allocated resources based at least in part on a location of the allocated resources relative to a second set of wireless resources associated with the low latency transmissions. Signaling for the location of null tones may provide semi-static or dynamic indications of the null tone locations.

Aspects of the disclosure introduced above are described below in the context of a wireless communication system. Aspects of noise and interference estimation for systems that employ multiple different TTI durations are then described. Aspects of the disclosure are further illustrated by and described with reference to apparatus diagrams, system diagrams, and flowcharts that relate to noise and interference estimation using multiple TTIs.

Figure 1:
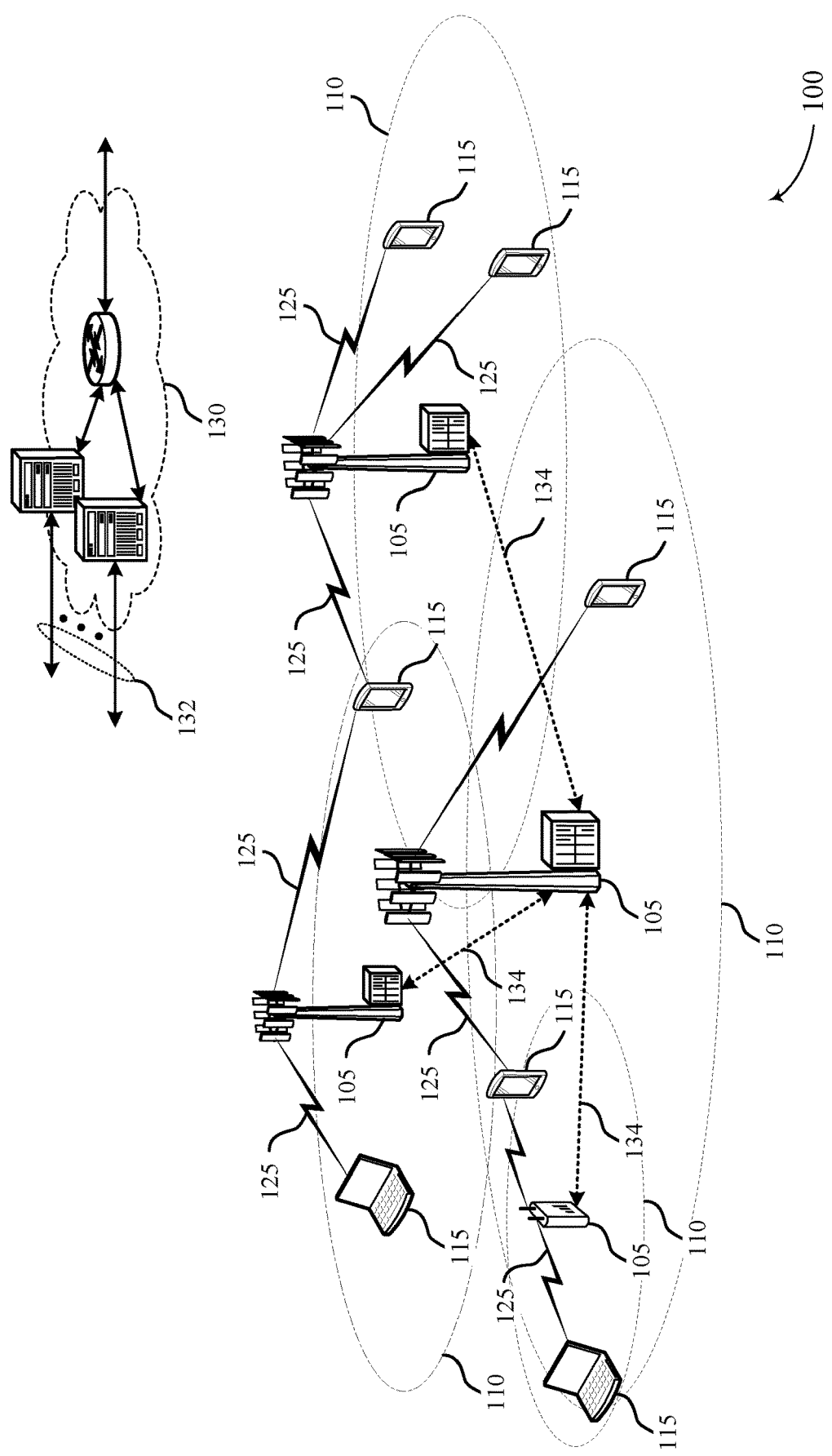
FIG. 1 illustrates an example of a wireless communications system that supports noise and interference estimation using multiple transmission time intervals (TTIs) in accordance with various aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. The wireless communications system 100 may support low latency applications using multiple TTIs as described herein. In some examples, noise and interference estimates may be performed according to techniques that account for interference from low latency TTIs, or other wireless transmissions, that may occur during the reception of non-low latency transmissions.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, wireless system 100 may utilize both licensed and unlicensed radio frequency spectrum bands. For example, wireless system 100 may employ LTE License Assisted Access (LTE-LAA) or LTE Unlicensed (LTE-U) radio access technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some cases, wireless communications system 100 may utilize one or more enhanced component carriers (eCCs). An eCC may be characterized by one or more features including flexible bandwidth, different TTIs, and modified control channel configuration. In some cases, an eCC may be associated with a CA configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum).

An eCC characterized by flexible bandwidth may include one or more segments that may be utilized by UEs 115 that are not capable of monitoring the whole bandwidth or prefer to use a limited bandwidth (e.g., to conserve power). In some cases, an eCC may utilize a different TTI length than other CCs, which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1 ms TTIs, whereas an eCC may use a TTI length of a single symbol, a pair of symbols, or a slot. In some cases, a shorter symbol duration may also be associated with increased subcarrier spacing. In conjunction with the reduced TTI length, an eCC may utilize dynamic TDD operation (i.e., it may switch from DL to UL operation for short bursts according to dynamic conditions).

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARM) related control information.

In some examples, a UE 115 may estimate interference from one or more low latency transmissions, or other transmissions (e.g., Wi-Fi transmissions), and decode a non-low latency communication based at least in part on the estimated interference. In some cases, the UE 115 may iteratively estimate interference for each OFDM symbol of two or more OFDM symbols of the non-low latency communication. Additionally or alternatively, in some examples, the UE 115 may use one or more null tones configured in the non-low latency communications to estimate received interference. The UE 115 may use the estimate of interference to estimate a channel to mitigate low latency interference and to reliably decode the non-low latency communication. In some cases, the interfering low latency communication may occur within the serving cell of the UE 115; while in other cases, the interfering low latency communication may occur in a neighboring cell.

Figure 2A:
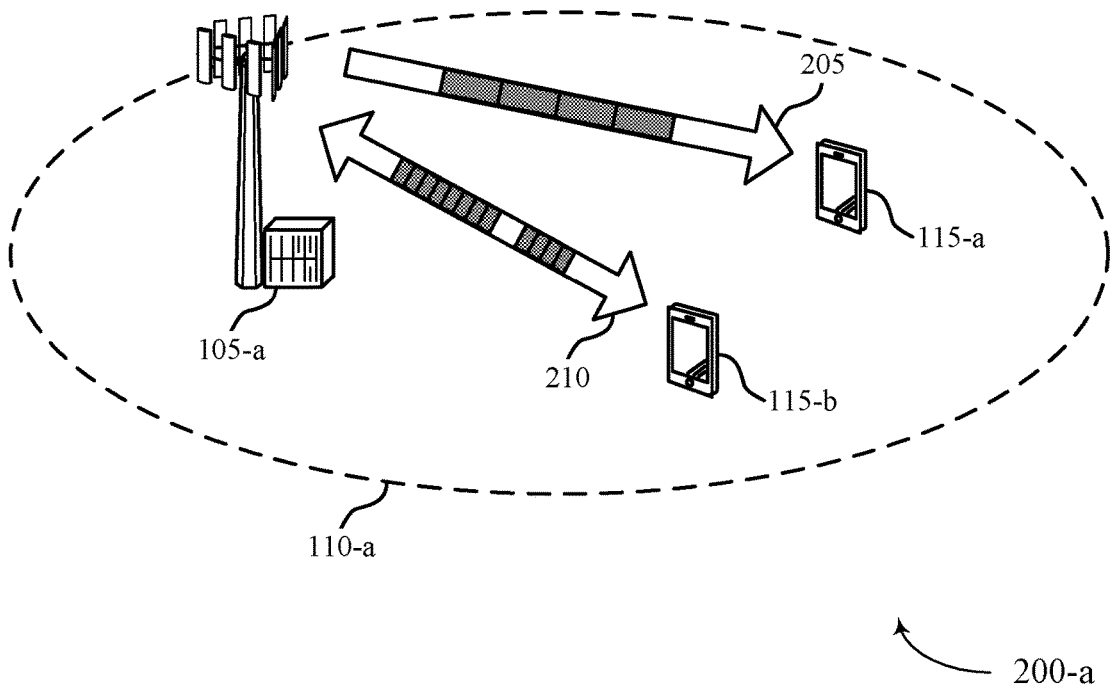
FIGS. 2A and 2B illustrate examples of wireless communications systems that support noise and interference estimation using multiple TTIs in accordance with various aspects of the present disclosure.

FIG. 2A illustrates an example of a wireless communications system 200-a that supports noise and interference estimation using multiple TTIs in accordance with various aspects of the present disclosure. Wireless communications system 200-a may include UE 115-a, UE 115-b, and base station 105-a, which may be examples of a UE 115 or a base station 105 described with reference to FIG. 1. Base station 105-a may communicate with UE 115-a or UE 115-b when the devices are within coverage area 110-a, as generally described with reference to FIG. 1. A non-low latency communication 205 may use 1 ms transmit time intervals, while a low latency communication 210 may use shorter duration TTIs (e.g., one slot TTIs, four-symbol TTIs, two-symbol TTIs, or one-symbol TTIs). Additionally, in some cases one or more Wi-Fi transmitters (e.g., a Wi-Fi access point or station) may also transmit potentially interfering signals that may interfere with non-low latency communication 205 or low latency communication 210, in deployments where base station 105-a and UEs 115-a or 115-b use a shared radio frequency spectrum band for all or a portion of communications. Such Wi-Fi interference at non-low latency communication 205 may be similar to interference from low latency communication 210 in that it may start after the non-low latency communication 205 starts and may not last for the duration of the non-low latency communication 205 TTI.

In the absence of low latency or WiFi transmissions, interference estimation in legacy LTE may be based on the use of one or more reference signals, such as cell-specific reference signal (CRS) transmissions in specified tones, demodulation reference signal (DMRS) transmissions in specified tones, or combinations thereof. The location of CRS/DMRS tones may depend upon the transmission mode used for a particular transmission. However, in deployments where low latency, Wi-Fi, or both are present, interference may be generated that covers a fraction of OFDM symbols of the non-low latency communications 205 TTI. That is, low latency or WiFi may cause bursty interference for non-low latency communications 205 or even low latency communications having a TTI duration that is longer than a duration of the bursty interference. Depending on the length and location of the bursty interference within a TTI, such interference may not overlap CRS or DMRS tones. Furthermore, the interference profile of such bursty interference may be symbol dependent, and in some examples a receiver may perform locally implemented interference estimation for use in channel estimation and data demodulation.

In some examples, a receiving device may receive a non-low latency communication while a neighbor device may participate in a low latency communication and another neighbor device may participate in Wi-Fi communications. In some cases, the low latency or Wi-Fi communication may interfere with the non-low latency communication. While non-low latency communication is discussed in this example, similar techniques may be used for low latency communications having a TTI duration that is longer than a duration of the interference (e.g., slot TTI low latency communications that may be interfered by one-symbol or two-symbol low latency transmissions). The receiving device may perform interference estimation, in some examples, on a per-symbol basis to estimate interference per symbol in the non-low latency communication. The interference estimate may be used to determine a channel estimate that may be used to demodulate the non-low latency communications. In some cases, the interference estimate may be iteratively updated for each OFDM symbol of two or more OFDM symbols of the non-low latency communication. In some cases, the serving cell may also generate null tones for interference estimation. The receiving device may then decode the non-low latency communication according to the received indicator.

For example, base station 105-a may schedule UE 115-a for a non-low latency communication 205. Base station 105-a may then prepare a transmission and transmit a downlink grant and data to UE 115-a. In some cases, low latency transmissions are scheduled on a per TTI basis and may extend through a non-low latency TTI. For example, base station 105-a or UE 115-b may subsequently schedule low latency communication 210 during the non-low latency communication 205 transmission (e.g., the low latency communication may not be scheduled until the middle of the subframe when it will occur). In some cases, low latency communication 210 may use resources that overlap or are contiguous with the resources scheduled for non-low latency communication 205. Therefore, low latency communication 210 may affect the transmission (e.g., interference with or puncturing of resources) to UE 115-b. A Wi-Fi transmitter may have similar interference on non-low latency communication 205.

In some examples, as indicated above, UE 115-a may estimate interference from low latency communications 210, or other transmissions (e.g., Wi-Fi transmissions), and decode non-low latency communication 205 based at least in part on the estimated interference. In some cases, UE 115-a may iteratively estimate interference for each OFDM symbol of two or more OFDM symbols of the non-low latency communication. In some examples, UE 115-a may determine an initial noise and interference estimation using a differential method such as a DMRS-based scheme used in some legacy LTE deployments. UE 115-a may then perform channel estimation using DMRS resource elements (REs) and interference and noise may be estimated over DMRS symbols. UE 115-a may then demodulate the received signal, such as through minimum mean squared error (MMSE) demodulation over all REs. UE 115-a may then update the estimate of noise and interference using the received symbol over each RE, the estimated channel and the estimated demodulated symbol of each RE. UE 115-a may then perform a further channel estimation on this updated estimate and the process may be iteratively repeated a certain number of times, such as 2-3 iterations.

In some cases, base station 105-a may transmit null tones to UE 115-a. The null tones may be transmitted based on low latency communication 210 and may be used for interference estimation by UE 115-b. In some cases, the null tones may be used in frequency or time resources allocated to predetermined resources. Additionally or alternatively, the null tones may be dynamically used based on unexpected low latency transmissions. For example, base station 105-a may include null tones in a non-low latency communication 205. In some cases, base station 105-a may semi-statically configure null tones, while in other cases null tones may be dynamically configured based on low latency transmissions.

During or at the end of the non-low latency communication 205 punctured or interfered with by a low latency or Wi-Fi transmission, UE 115-a may decode the non-low latency communication 205 and may update channel estimates, and may mitigate the low latency or Wi-Fi interference.

Figure 2B:
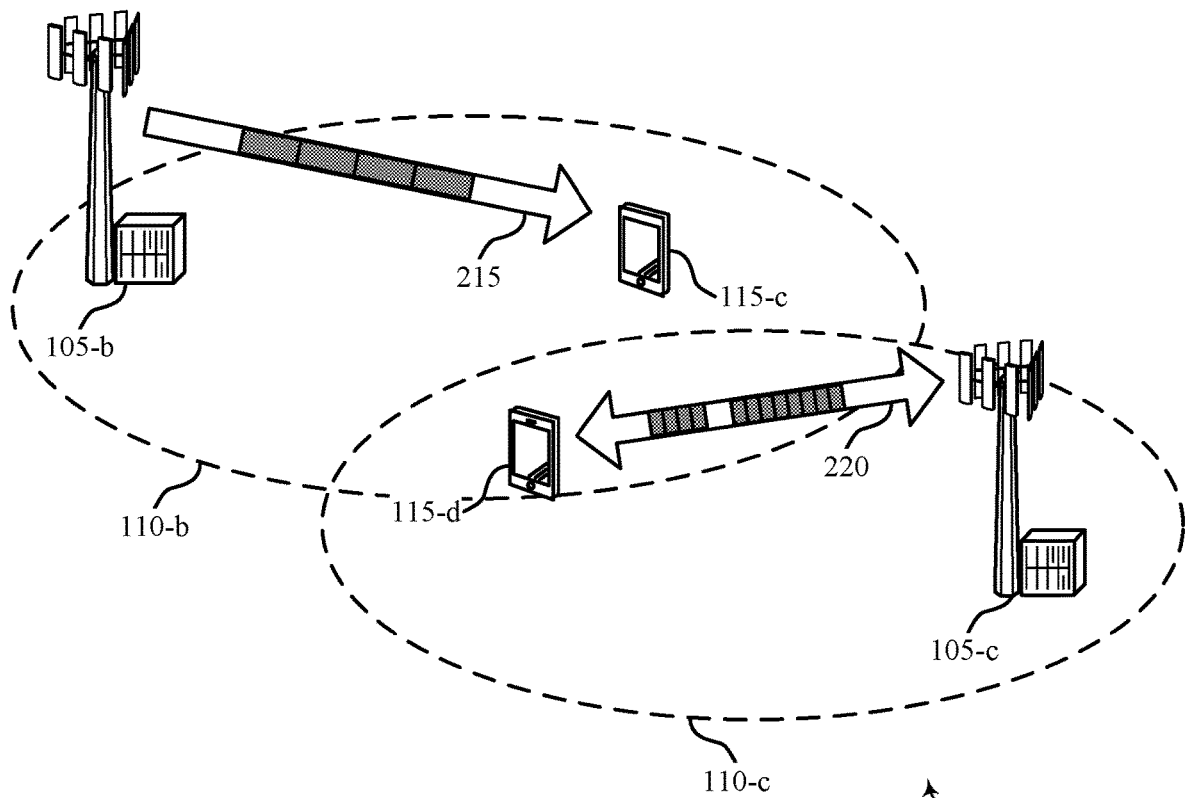

FIG. 2B illustrates an example of a wireless communications system 200-b that supports noise and interference estimation using multiple TTIs in accordance with various aspects of the present disclosure. Wireless communications system 200-b may include UE 115-c, UE 115-d, base station 105-b, and base station 105-c, which may be examples of a UE 115 or a base station 105 described with reference to FIG. 1. Base station 105-b and base station 105-c may communicate with UE 115-c or UE 115-d when the devices are within respective coverage area 110-b or coverage area 110-c, as described with reference to FIG. 1. A non-low latency communication 215 may use 1 ms TTIs, for example, while a low latency communication 220 may use shorter TTIs.

In this example, UE 115-c receives non-low latency communication 215 from a serving cell of base station 105-b, and the low latency communication 220 from a neighboring cell at neighboring base station 105-c may interfere with the non-low latency communication 215. The UE 115-c may perform channel estimation based on interference estimates in an iterative manner, similarly as discussed above, and demodulate the non-low latency communication 215 based on the channel estimate. Additionally or alternatively, the serving cell base station 105-c may insert one or more null tones into non-low latency communication 215, which may be used for interference estimation at UE 115-c.

Figure 3:
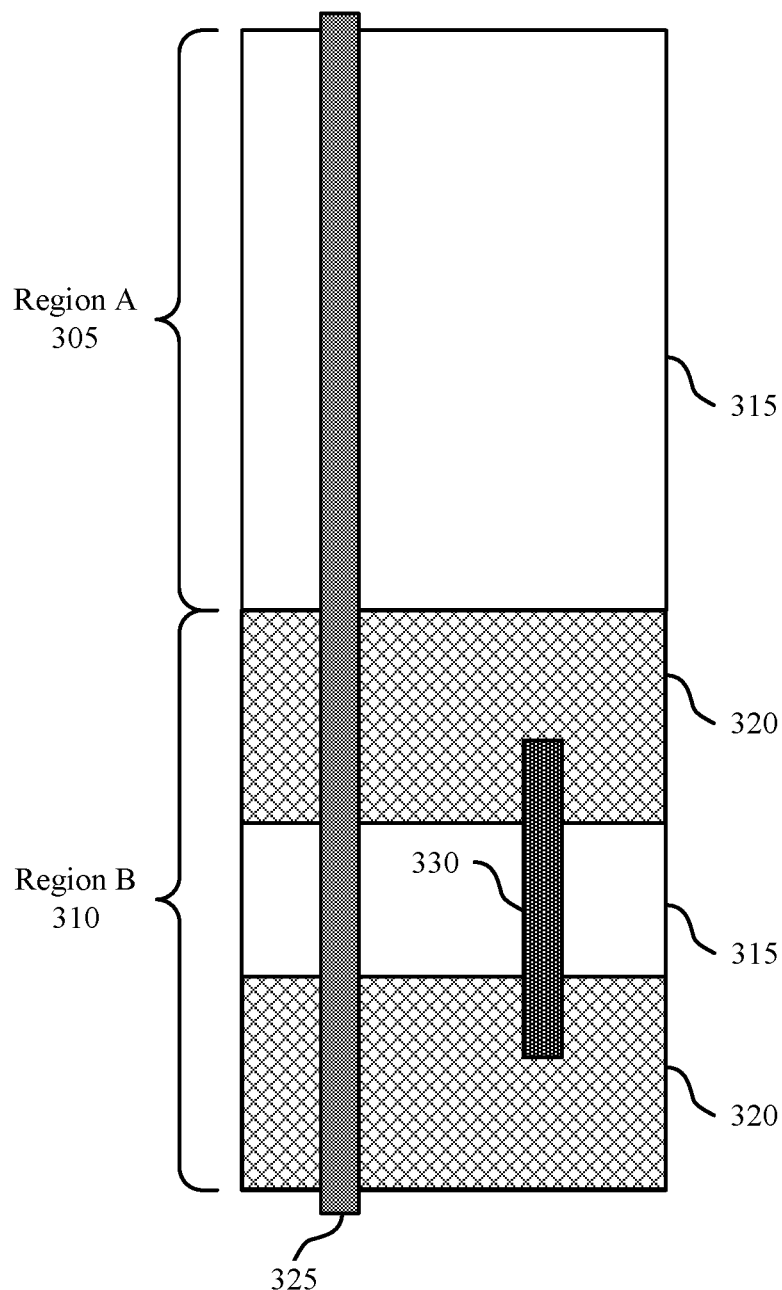
FIGS. 3 and 4 illustrate examples of wireless resources that support noise and interference estimation in a system using multiple TTIs in accordance with various aspects of the present disclosure.

FIG. 3 illustrates an example of wireless resources 300 that support noise and interference estimation in a system using multiple TTIs in accordance with various aspects of the present disclosure. Wireless resources 300 may illustrate aspects of a transmission between UEs 115 and base stations 105, as described with reference to FIGS. 1-2. Wireless resources 300, in some examples, represent resources of a primary cell (pCell), served by a primary CC, that may be used for communication between a base station and a UE. The base station and UE may also establish one or more secondary cells (sCells), served by corresponding secondary CCs according to established LTE carrier aggregation techniques. At the pCell, wireless resources 300 may correspond to a subframe that is partitioned into region A 305 and region B 310. Region A 305 may be reserved for legacy LTE over the pCell, which may include non-low latency communications 315. Region B 310 may be used for low latency communications 320, or non-low latency communications 315. In cases where one or more sCells may be configured, a sCell of the one or more sCells may support low latency and non-low latency communications in both region A 305 and region B 310. Interference may be present in wireless resources 300 in the form of Wi-Fi signals 325, in examples where a shared radio frequency spectrum band is used for communications, low latency transmissions 330 from neighboring cells, or combinations thereof. For pCell transmissions, Wi-Fi signals 325 may be present in both region A 305 and region B 310, while low latency transmissions 330 may be present in region B 310. For sCell transmissions, low latency transmissions 330 may be present in both region A 305 and region B 310.

Figure 4:
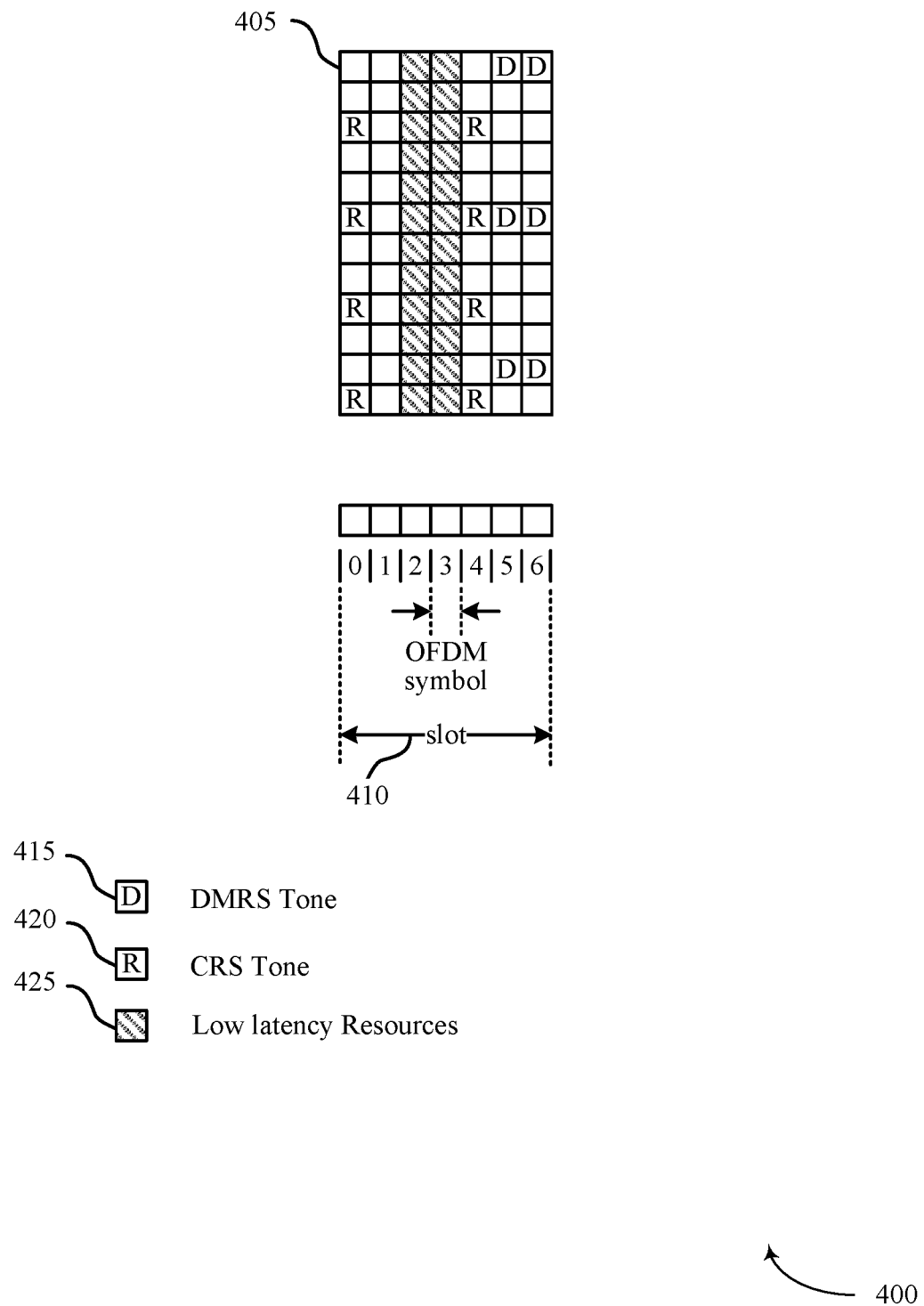

FIG. 4 illustrates an example of wireless resources 400 that support noise and interference estimation in a system using multiple TTIs in accordance with various aspects of the present disclosure. In some cases, wireless resources 400 may represent aspects of transmissions between a UE 115 or base station 105 as described with reference to FIGS. 1-2. As indicated above, in some cases a low latency communication may have a TTI that is shorter than a TTI of a non-low latency communication. In some examples, resources 405 may represent a portion of resources used for non-low latency transmissions, which may occupy a first slot 410 of a subframe. Each slot of a subframe may have seven OFDM symbols with normal cyclic prefix. In other examples, resources 405 may represent a low latency communication having a TTI that corresponds to one slot.

In the example of FIG. 4, wireless resources 400 may occupy a portion of region B as described with respect to FIG. 3 or may occupy a portion of sCell resources, in which one or more interfering low latency communications may overlap with wireless resources 405. In this example, low latency resources 425 having a two-symbol TTI may be present in symbol 2 and symbol 3 of slot 410. Furthermore, as indicated above, wireless resources 400 may include certain reference signals, and in this example DMRS tones 415 may be present in symbol 5 and symbol 6 of the slot 410, and CRS tones 420 may be present in symbol 0 and symbol 4 of the slot 410. Thus, the low latency resources in symbol 2 and symbol 3 do not overlap with any DMRS tones 415 or CRS tones 420. In such examples, a non-low latency transmission, or a low latency transmission having a one-slot TTI duration corresponding to slot 410, may not capture interference from low latency resources 425 in CRS tones 420 or DMRS tones 415, which may degrade system performance.

In order to estimate interference from low latency resources 425, a UE may, in some cases, perform an iterative data-aided channel estimation that is based at least in part on an interference estimate for each symbol of a received transmission. The iterative data-aided channel estimation may provide a channel estimate for each received OFDM symbol, which may then be used for demodulating received signals to mitigate the interference caused by the low latency resources 425. In examples where the resources 400 are in a shared radio frequency spectrum band, the iterative data-aided channel estimation may be used to mitigate interference caused by other wireless transmissions, such as Wi-Fi transmissions, that may affect one or more symbols that do not contain a CRS tone 420 or DMRS tone 415.

Figure 5:
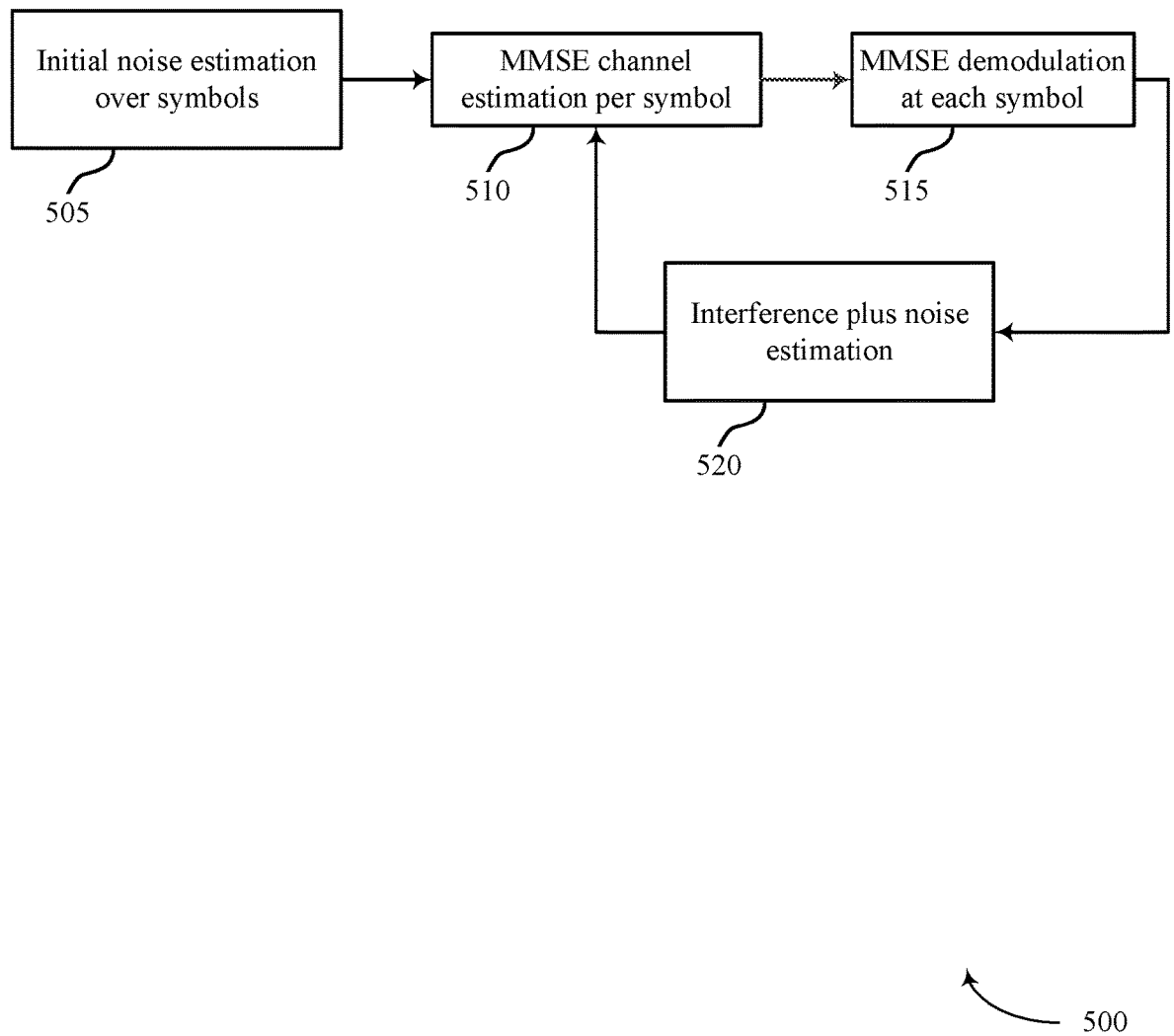
FIG. 5 illustrates an example of an iterative data-aided noise and interference estimation in accordance with various aspects of the present disclosure.

FIG. 5 illustrates an example of an iterative data-aided noise and interference estimation 500 in accordance with various aspects of the present disclosure. In some cases, the iterative data-aided noise and interference estimation 500 may represent aspects of techniques performed by a UE 115 or base station 105 as described with reference to FIGS. 1-2.

In the example of FIG. 5, a UE, at block 505, may determine an initial noise and interference estimation using a differential method such as a DMRS-based scheme used in some legacy LTE deployments. In some examples, a base station configuring resources for transmissions to the UE may configure a transmission mode that supports interference estimation of low latency or Wi-Fi transmissions that may cause interference. The UE may then, at block 510 perform channel estimation per symbol. For an initial channel estimation, the UE may use DMRS REs and interference and noise that may be estimated over DMRS symbols, and channel estimation may be based on MMSE over the DMRS symbols. At block 515, the received symbols may be demodulated, such as through MMSE demodulation over all REs at each symbol based on the channel estimation. The UE may then determine an updated estimate of noise and interference at block 520 using the received symbol over each RE, the estimated channel, and the estimated demodulated symbol of each RE. The updated estimate may be determined, in some examples, according to $$y_{n,i} - H'_{n,i} x'_{n,i} = z'_{n,i}$$

where $y_{n,i}$ is the received signal at symbol n and RE i;

$H'_{n,i}$ is the precoded channel over symbol n and RE i (i.e., the channel estimate of block 510);

$x'_{n,i}$ is the modulated signal transmitted at symbol n and RE i (i.e., the demodulated signal of block 515); and $z'_{n,i}$ is the noise and interference at symbol n and RE i.

This updated estimate may then be used for a further channel estimation at block 510, and the process may be iteratively repeated a certain number of times (e.g., 2-3 iterations). In some examples, the initial noise and interference estimate may be based on an averaged power over each OFDM symbol as $$\hat{\sigma}_n^2 = \frac{1}{12 * num\_ant} * \Sigma_i \| z'_{n,i} \|^2,$$

which ignores off-diagonal terms, and a covariance of the noise and interference over symbol n which may be estimated as $$N_{t,n} = \frac{1}{num\_REs} \Sigma_i z_{n,i} z_{n,i}^H,$$

which may capture an interference signature for the symbol. Such an iterative data-aided scheme provides noise plus interference estimation over each OFDM symbol per resource block (RB). In some cases, the interference may be wideband, and averaging of power over OFDM symbols can be done over multiple RBs to enhance performance.

Figure 6:
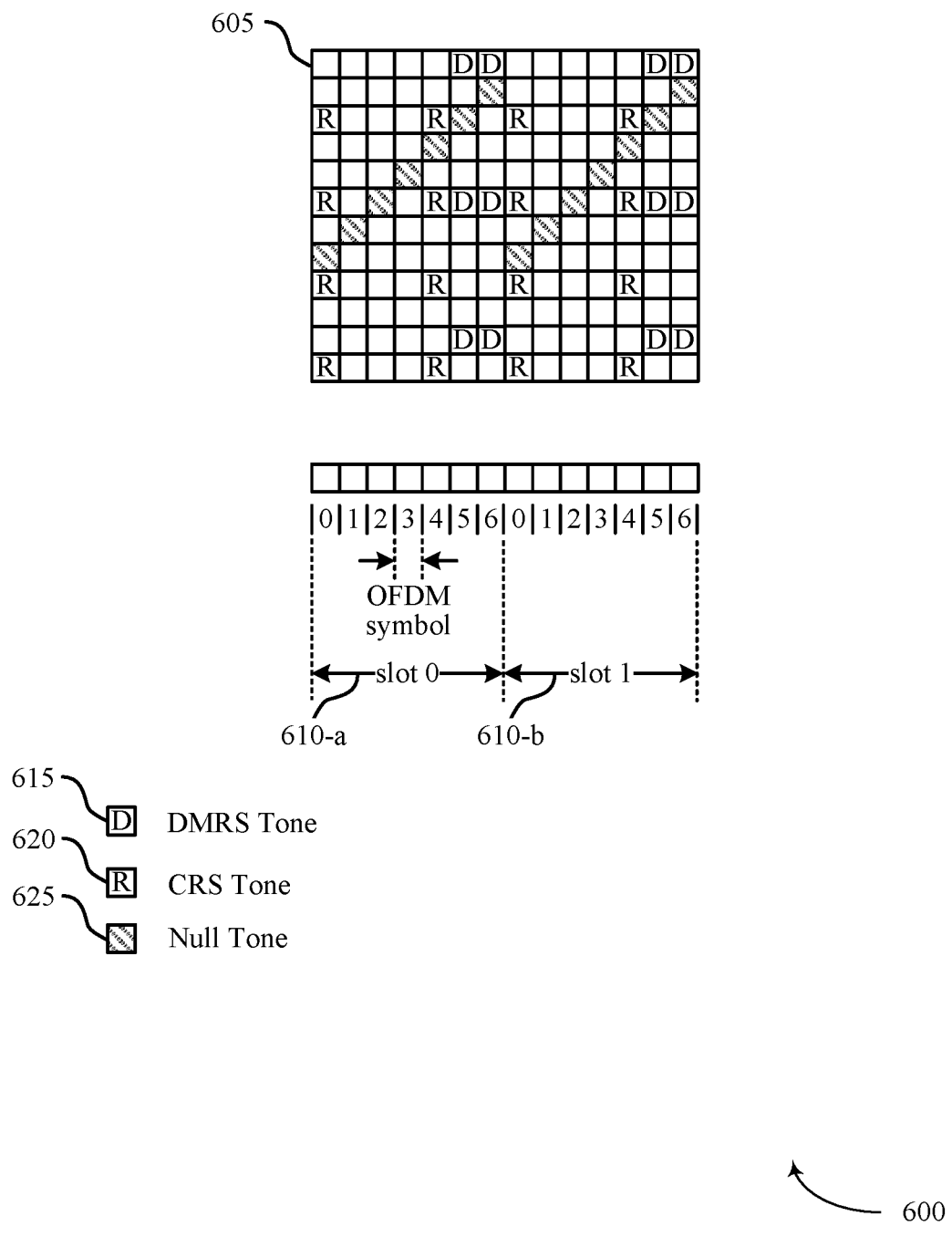
FIGS. 6 and 7 illustrate examples of wireless resources configured with null tones that support noise and interference estimation in accordance with various aspects of the present disclosure.

FIG. 6 illustrates an example of wireless resources 600 configured with null tones that support noise and interference estimation in accordance with various aspects of the present disclosure. As indicated above, in some examples null tones may be configured in certain resources to aid in interference estimation at a UE. In some cases, wireless resources 600 may represent aspects of transmissions between a UE 115 or base station 105 as described with reference to FIGS. 1-2. In the example of FIG. 6, wireless resources 600 may occupy a portion of region B as described with reference to FIG. 3 or may occupy a portion of sCell resources, in which one or more interfering low latency communications may overlap with resources 405 as described with reference to FIG. 4. In this example, non-low latency resources 605 may span a wireless subframe having a first slot 610-a and a second slot 610-b. Furthermore, as indicated above, wireless resources 600 may include certain reference signals, and in this example DMRS tones 615 may be present in symbol 5 and symbol 6 of each slot 610, and CRS tones 620 may be present in symbol 0 and symbol 4 of each slot 610.

In addition to the reference signal tones, wireless resources 600 may also include a number of null tones 625, in which no signal is transmitted by a base station. In some cases, each OFDM symbol may include at least one null tone 625, as illustrated in FIG. 6. The null tones 625 may be configured such that they do not overlap with DMRS tones 615 or CRS tones 620, and a covariance of the noise and interference over symbol n may be estimated as $N_{t,n} = y_{n,i} y_{n,i}^H$, where i is the index of the null RE and $y_{n,i}$ is the received signal at symbol n and RE i. If interference is wideband, null tone averaging over multiple null tones 625 per symbol may provide enhanced results.

While FIG. 6 illustrates one null tone 625 per symbol, in some cases interference estimation may be performed using null tones 625 or even non-zero-power tones (e.g., DMRS tones) that are present in a symbol. In some examples, null tones 625 may be inserted in certain RBs in which interference is likely to occur, and may not be inserted in other RBs. For example, as discussed above, some resources may be reserved for subframe-based, non-low latency communications (e.g., region A 305 as described with reference to FIG. 3), and if the resources 605 are allocated in a dedicated radio frequency spectrum band, and thus no Wi-Fi interference will likely be present, null tones may not be inserted in such resources. Thus, for a particular downlink resource allocation, RBs in certain regions may not have null tones 625 (e.g., region A 305 as described with reference to FIG. 3), while RBs in some other regions (e.g., sCell regions or region B 310 as described with reference to FIG. 3) may have null tones 625 inserted. Furthermore, insertion of null tones 625 may be symbol or TTI location dependent in some cases. For example, if allocated resources are in a dedicated radio frequency spectrum band, and only 2-symbol TTI or slot-TTI low latency communications are supported, then interference characteristics may be similar or the same for at least 2-symbols in a same low latency TTI. As a result, interference estimation may be performed with null tones 625 inserted in alternating symbols, rather than in every symbol of a TTI. Additionally, if a low latency TTI already has one or more DMRS tones 615 or CRS tones 620, interference estimation may be sufficient using the reference signal (RS) symbol(s), and null tones 625 may not be needed in such TTIs.

Figure 7:
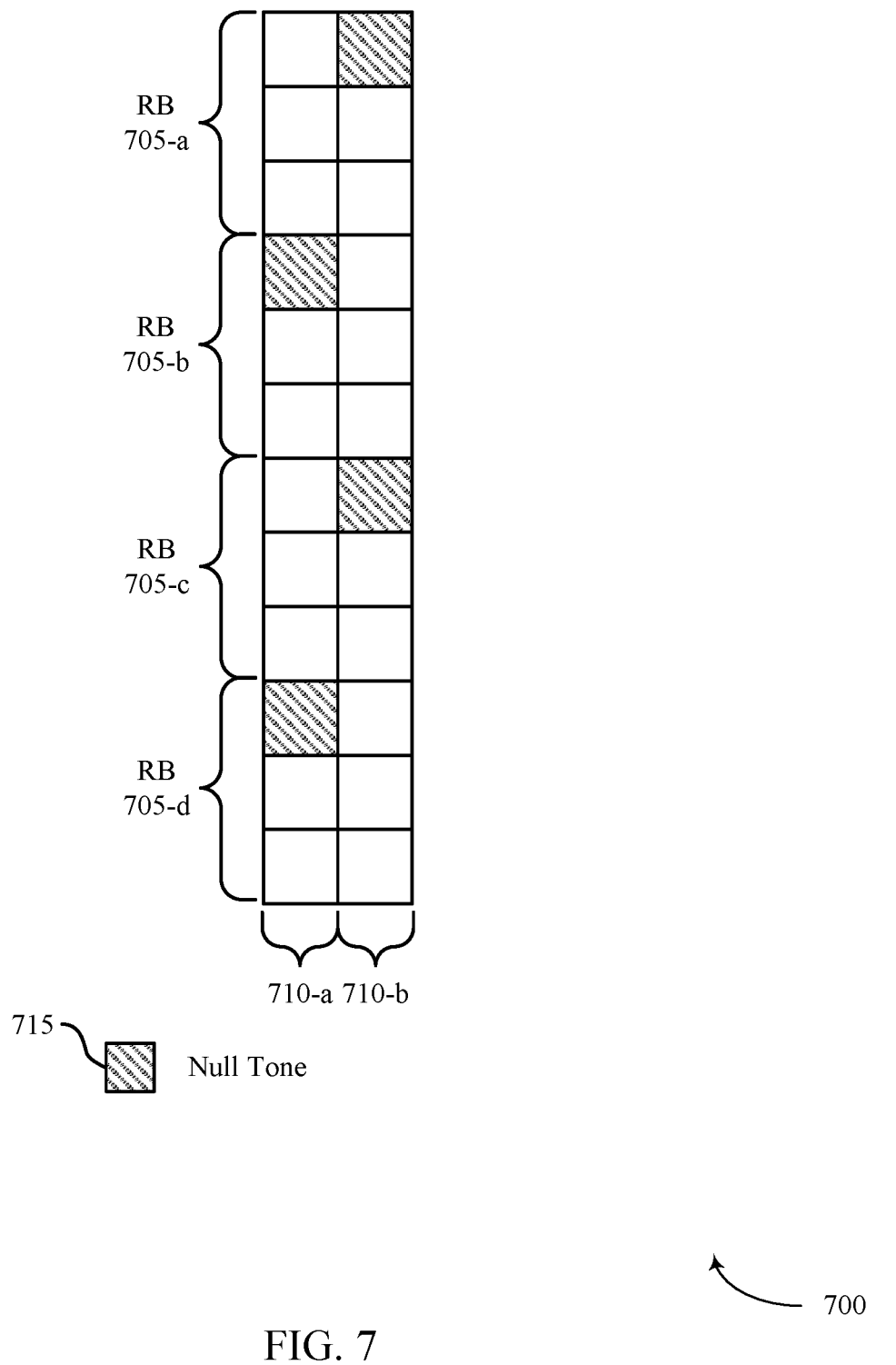

FIG. 7 illustrates another example of wireless resources 700 configured with null tones that support noise and interference estimation for systems using multiple TTIs in accordance with various aspects of the present disclosure. In some cases, wireless resources 700 may represent aspects of communications between a UE 115 or base station 105 as described with reference to FIGS. 1-2. In this example, multiple RBs 705 (e.g., RB 705-a, RB 705-b, RB 705-c, and RB 705-d) may be allocated that span potential two-symbol TTI duration low latency resources that may include a first symbol 710-a and a second symbol 710-b. In this example, alternating RBs 705 may have null tones 715 inserted in alternating symbols 710. Thus, first RB 705-a and third RB 705-c may have a null tone 715 inserted in the second symbol 710-b, and the second RB 705-b and the fourth RB 705-d may have a null tone 715 inserted in the first symbol 710-a, and so on.

In some cases, interference and noise estimation also may be subframe dependent. For example, in TDD, some anchor DL subframes (e.g., DL subframes 0 and 5) may not be configurable for any low latency services. As a result, in deployments in dedicated radio frequency spectrum bands, interference estimation may not be necessary for these subframes. Additionally, interference and noise estimation also may be dependent on a modulation and coding scheme (MCS) or transport block size (TBS). For example, null tones may be omitted for higher MCSs, as null tones may cause dimension or coding gain loss, or both. Thus, in some examples null tones 715 may be inserted for lower MCSs but omitted for higher MCSs. Additionally, in some cases interference management resources (IMR) may be allocated, and may be used for interference estimation, and thus null tones 715 may be omitted from such allocations that are within a low latency TTI. In some cases, the insertion of null tones 715 as part of demodulation may also be used as reference resources for channel state information (CSI) feedback.

In some cases, management of null tones 715 may be performed for UEs that are capable of low latency communications as well as for UEs that may not be capable of low latency communications. For example, a low latency-capable UE may be configured for interference estimation based on null tones 715, and a non-low latency-capable UE may also be signaled as to whether, in a certain low latency TTI opportunity, one or more null tones 715 are present or not, in order to enhance interference estimation. Such indications may be semi-static (e.g., via a system information block (SIB)) or dynamic (e.g., indicated on a per-subframe basis).

Figure 8:
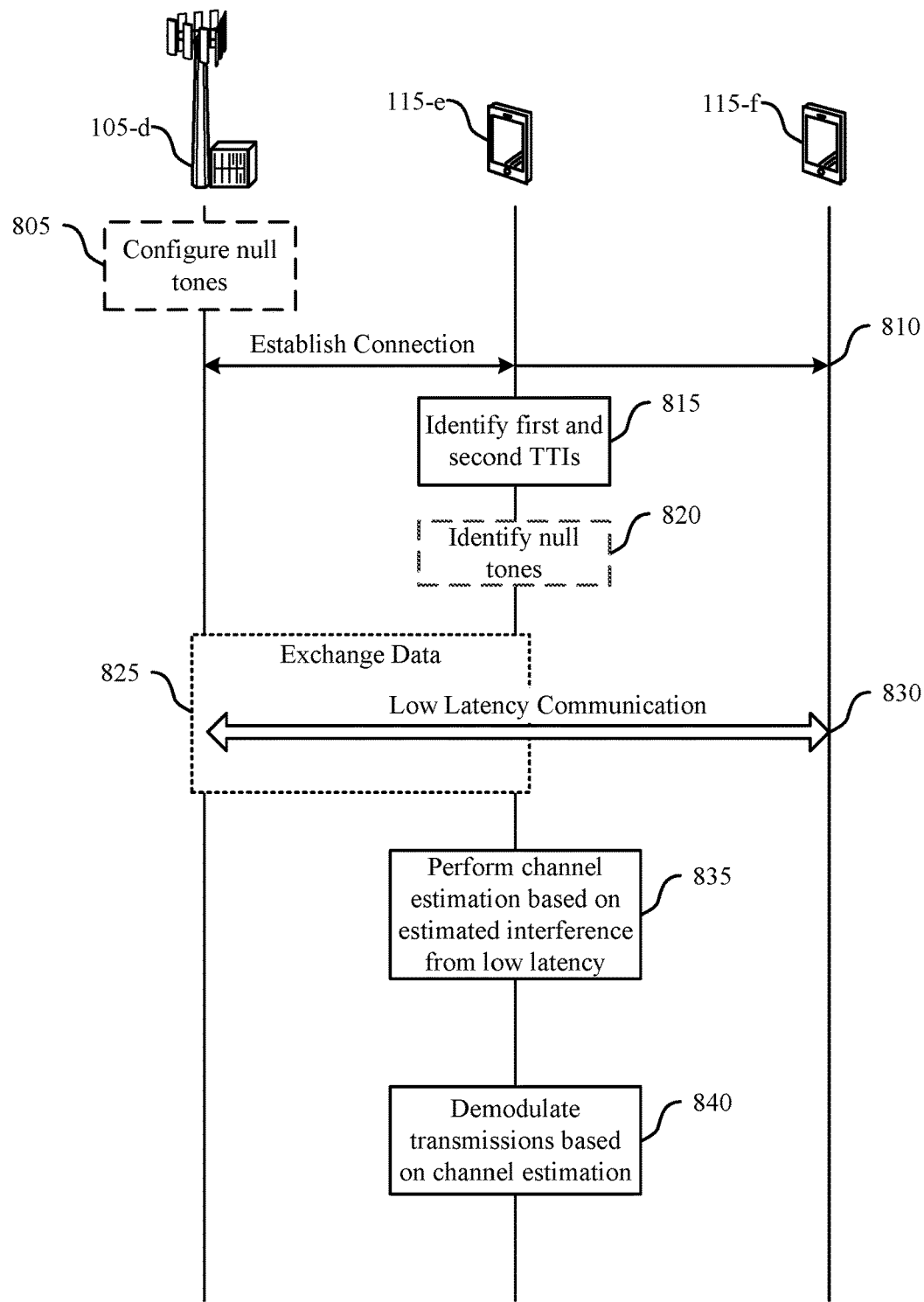
FIG. 8 illustrates an example of a process flow in a system that supports noise and interference estimation using multiple TTIs in accordance with various aspects of the present disclosure.

FIG. 8 illustrates an example of a process flow 800 for noise and interference estimation in systems using multiple TTIs in accordance with various aspects of the present disclosure. Process flow 800 may include UE 115-e, UE 115-f, and base station 105-d, which may be examples of a UE 115 or base station 105 as described with reference to FIGS. 1-2. In some examples, UE 115-e and UE 115-f may perform noise and interference estimation to facilitate the decoding of data.

At 805, base station 105-d may optionally configure null tones for subsequent transmissions. Base station 105-d may establish a connection 810 with UE 115-e and UE 115-f (not necessarily at the same time). UE 115-e and UE 115-f may be located in a cell supported by base station 105-d, for example.

At 815, UE 115-e may identify first and second TTIs having different TTI durations. At 820, UE 115-e may optionally identify null tones in a resource allocation (e.g., based on reception of a control channel indication of a grant to UE 115-e).

At 825, base station 105-d and UE 115-e may exchange data over a data channel. UE 115-e may receive data during a first TTI (e.g., a 1 ms TTI) utilizing resources in a data region. A low latency communication 830 may occur between base station 105-d and UE 115-f. The low latency communication 830 may utilize a second TTI that is shorter than the first TTI (e.g., a one-slot TTI, two-symbol TTI, or one-symbol TTI). These shorter TTI intervals may allow base station 105-d to schedule urgent transmissions or data with reduced latency.

At 835, UE 115-e may perform channel estimation based on estimated interference from the low latency communication 830. The channel estimation may be based on an iterative noise and interference estimation. Additionally or alternatively, the channel estimation may be based on a detected power received during one or more null tones.

At 840, UE 115-e may demodulate the transmission based on the channel estimation. While interference from low latency communication 830 are illustrated in FIG. 8, similar techniques may be used for noise and interference estimation for other transmissions that may interfere with transmissions to UE 115-e, such as Wi-Fi transmissions that may be received in deployments that utilize a shared radio frequency spectrum band.

Figure 9:
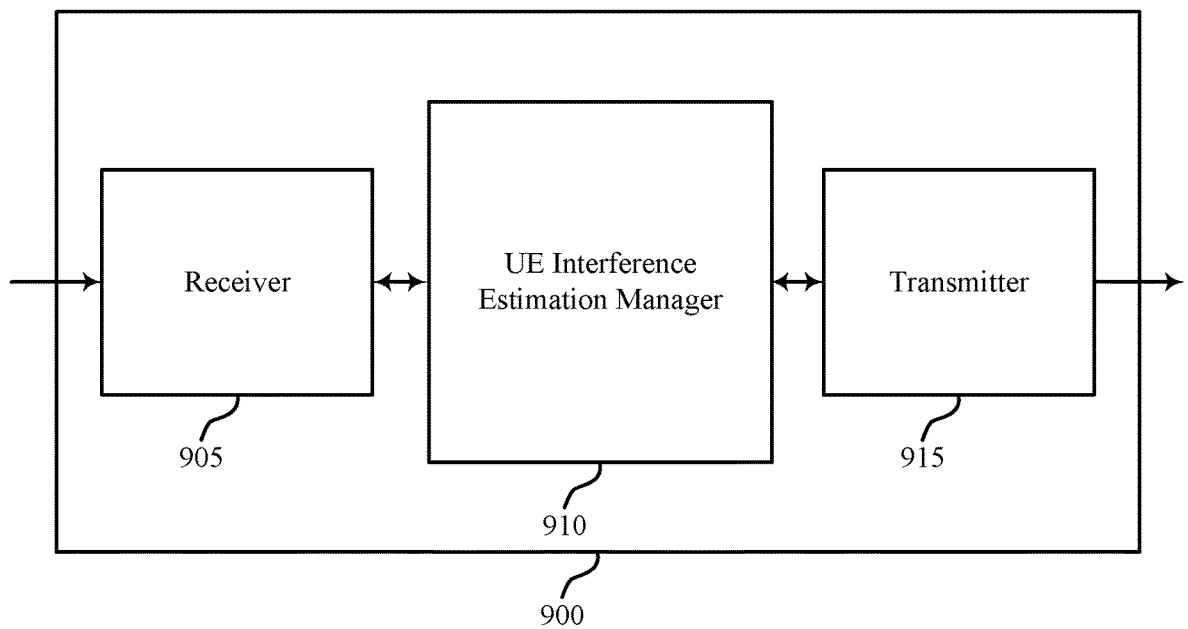
FIGS. 9 through 11 show block diagrams of a wireless device that supports noise and interference estimation using multiple TTIs in accordance with various aspects of the present disclosure.

FIG. 9 shows a block diagram of a wireless device 900 that supports noise and interference estimation using multiple TTIs in accordance with various aspects of the present disclosure. Wireless device 900 may be an example of aspects of a UE 115 as described with reference to FIGS. 1, 2, and 8. Wireless device 900 may include receiver 905, UE interference estimation manager 910, and transmitter 915. Wireless device 900 may also include a processor. Each of these components may be in communication with each other.

The receiver 905 may receive information such as packets, user data, or control information associated with various information channels (e.g., control channels, data channels, and information related to noise and interference estimation using multiple TTIs, etc.). Information may be passed on to other components of the device. The receiver 905 may be an example of aspects of the transceiver 1225 as described with reference to FIG. 12.

The UE interference estimation manager 910 may identify a first TTI for reception of a first set of transmissions and a second TTI for reception of a second set of transmissions, where the first TTI has a longer duration than the second TTI. The receiver 905 may receive the first set of transmissions and receive the second set of transmissions, and the UE interference estimation manager 910 may perform a channel estimation for the first set of transmissions based on an estimated interference from the second set of transmissions for OFDM symbols of the first set of transmissions. The UE interference estimation manager 910 may then demodulate the first set of transmissions based on the channel estimation for the first set of transmissions. The UE interference estimation manager 910 may also be an example of aspects of the UE interference estimation manager 1205 as described with reference to FIG. 12.

The UE interference estimation manager 910 in some cases may also identify one or more null tones within one or more OFDM symbols of the first set of wireless resources associated with the first set of transmissions based on a location of the first set of wireless resources relative to a second set of wireless resources associated with the second set of transmissions. The UE interference estimation manager 910 may estimate interference on the first set of transmissions from the second set of transmissions based on signals received during the one or more null tones.

The transmitter 915 may transmit signals received from other components of wireless device 900. In some examples, the transmitter 915 may be collocated with a receiver in a transceiver module. For example, the transmitter 915 may be an example of aspects of the transceiver 1225 as described with reference to FIG. 12. The transmitter 915 may include a single antenna, or it may include a plurality of antennas.

Figure 10:
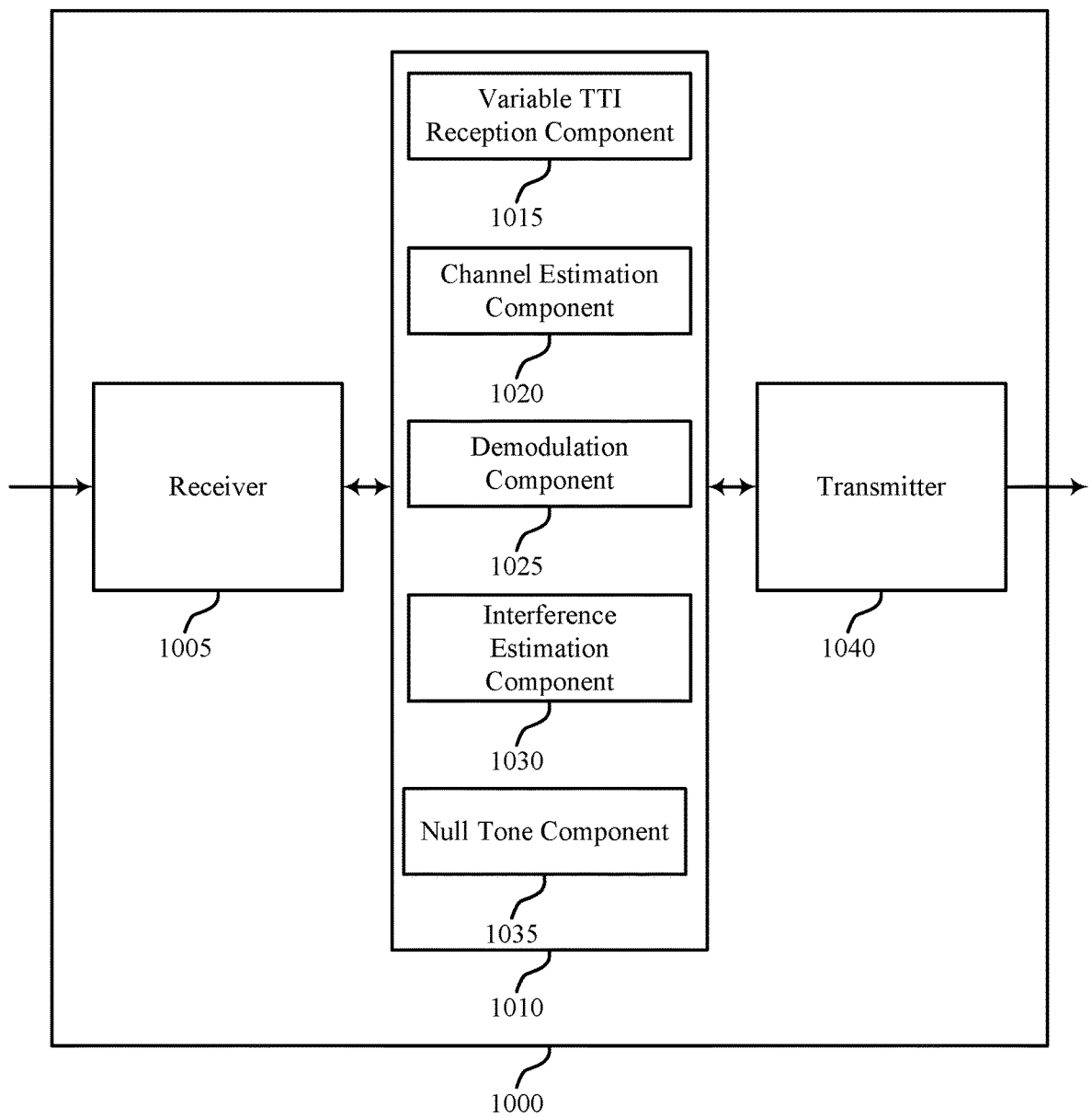

FIG. 10 shows a block diagram of a wireless device 1000 that supports noise and interference estimation using multiple TTIs in accordance with various aspects of the present disclosure. Wireless device 1000 may be an example of aspects of a wireless device 900 or a UE 115 as described with reference to FIGS. 1, 2, 8, and 9. Wireless device 1000 may include receiver 1005, UE interference estimation manager 1010 and transmitter 1040. Wireless device 1000 may also include a processor. Each of these components may be in communication with each other.

The receiver 1005 may receive information, which may be passed on to other components of the device. The receiver 1005 may also perform the functions described with reference to the receiver 905 of FIG. 9. The receiver 1005 may be an example of aspects of the transceiver 1225 as described with reference to FIG. 12.

The UE interference estimation manager 1010 may be an example of aspects of UE interference estimation manager 910 as described with reference to FIG. 9. The UE interference estimation manager 1010 may include variable TTI reception component 1015, channel estimation component 1020, demodulation component 1025, interference estimation component 1030 and null tone component 1035. The UE interference estimation manager 1010 may be an example of aspects of the UE interference estimation manager 1205 as described with reference to FIG. 12.

The variable TTI reception component 1015 may identify a first TTI for reception of a first set of transmissions and a second TTI for reception of a second set of transmissions, where the first TTI has a longer duration than the second TTI. The receiver 1005 may receive the first set of transmissions, and receive the second set of transmissions.

The channel estimation component 1020 may perform a channel estimation for the first set of transmissions based on an estimated interference from the second set of transmissions for OFDM symbols of the first set of transmissions. In some cases, performing the channel estimation further includes performing a MMSE channel estimation for the first set of transmissions based on the estimated interference for the OFDM symbols and the one or more reference signals transmitted in the OFDM symbols. In some cases, the first set of transmissions are demodulated using a MMSE demodulation for the first set of transmissions based on the MMSE channel estimation for each of the OFDM symbols. While MMSE demodulation may be used in some cases, any form of demodulation may be used based on a channel estimation for each of the OFDM symbols.

The demodulation component 1025 may demodulate the first set of transmissions based on the channel estimation for the first set of transmissions. The interference estimation component 1030 may estimate interference on the first set of transmissions from the second set of transmissions based on an iterative data-aided noise and interference estimation. Additionally or alternatively, the interference estimation component 1030 may estimate interference on the first set of transmissions from the second set of transmissions based on signals received during one or more null tones.

The null tone component 1035 may identify one or more null tones within one or more OFDM symbols of a first set of wireless resources associated with the first set of transmissions based on a location of the first set of wireless resources relative to a second set of wireless resources associated with the second set of transmissions. In some examples, the null tone component may identify a second location (e.g., a location using a low latency TTI) as a subset of the first set of wireless resources that are configured for transmissions having both the first TTI and the second TTI, and identify the one or more null tones within the second location.

The null tone component 1035 may also identify at least one of one or more null tones within OFDM symbols that do not contain a reference signal, a first null tone within a first OFDM symbol of a first RB and a second null tone within a second OFDM symbol of a second RB, one or more null tones based on a type of subframe associated with the first set of wireless resources, one or more null tones based on a MCS of the first set of transmissions, one or more null tones based on a TBS of the first set of transmissions, or one or more null tones based on an IMR associated with the first set of wireless resources, or any combination thereof. In some examples, the null tone component 1035 may receive signaling indicating the one or more null tones. In some cases, identifying the one or more null tones further includes identifying the one or more null tones within a subset of the one or more OFDM symbols based on a number of OFDM symbols spanned by a second TTI (e.g., a low latency TTI).

In some cases, a DMRS or CRS may be present in wireless resources, and identifying the one or more null tones is based at least in part on the presence of the DMRS or the CRS in a symbol. In some cases, presence of null tones may be signaled, the signaling including semi-static signaling indicating a configuration of locations of the one or more null tones. In some cases, the signaling includes dynamic signaling indicating a configuration of locations of the one or more null tones.

The transmitter 1040 may transmit signals received from other components of wireless device 1000. In some examples, the transmitter 1040 may be collocated with a receiver in a transceiver module. For example, the transmitter 1040 may be an example of aspects of the transceiver 1225 as described with reference to FIG. 12. The transmitter 1040 may utilize a single antenna, or it may utilize a plurality of antennas.

Figure 11:
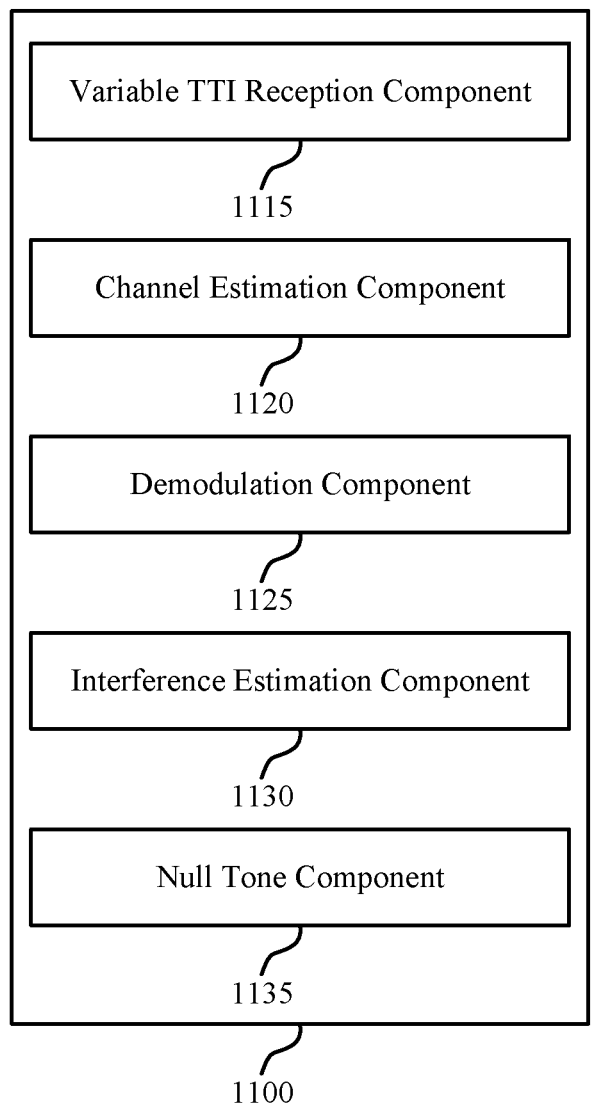

FIG. 11 shows a block diagram of a UE interference estimation manager 1100, which may be an example of the corresponding component of wireless device 900 or wireless device 1000. That is, UE interference estimation manager 1100 may be an example of aspects of UE interference estimation manager 910 or UE interference estimation manager 1010 as described with reference to FIGS. 9 and 10. The UE interference estimation manager 1100 may also be an example of aspects of the UE interference estimation manager 1205 as described with reference to FIG. 12.

The UE interference estimation manager 1100 may include variable TTI reception component 1115, channel estimation component 1120, demodulation component 1125, interference estimation component 1130, and null tone component 1135. Each of these modules may communicate, directly or indirectly, with one another (e.g., via one or more buses).

The variable TTI reception component 1115 may identify a first TTI for reception of a first set of transmissions and a second TTI for reception of a second set of transmissions, where the first TTI has a longer duration than the second TTI. The variable TTI reception component 1115 may receive the first set of transmissions and the second set of transmissions. In some case, the variable TTI reception component 1115 may receive a DMRS tone, a CRS tone, or a combination thereof. The variable TTI reception component 1115 may determine that the second set of transmissions are received over different OFDM symbols than the DMRS tone, the CRS tone, or the combination thereof.

The channel estimation component 1120 may perform a channel estimation for the first set of transmissions based on an estimated interference from the second set of transmissions for OFDM symbols of the first set of transmissions. The channel estimation component 1120 may perform MMSE channel estimation, in some examples. The demodulation component 1125 may demodulate the first set of transmissions based on the channel estimation for the first set of transmissions.

The interference estimation component 1130, in some examples, may estimate interference on a first set of transmissions from a second set of transmissions based on signals received during one or more null tones of the first set of transmissions. In some examples, the interference estimation component 1130 may perform iterative interference and noise estimation, and update an initial estimated interference based on at least one of the received first set of transmissions, a channel estimation, or a demodulated first set of transmissions, or any combination thereof. The interference estimation component 1130 may estimate interference for each OFDM symbol of a first set of transmissions based on one or more reference signals received in the OFDM symbols, determine an average power for each of the OFDM symbols, and determine a covariance of interference for the OFDM symbols based on the average power for each of the OFDM symbols.

The null tone component 1135 may identify one or more null tones within one or more OFDM symbols of a first set of wireless resources associated with the first set of transmissions based on a location of the first set of wireless resources relative to a second set of wireless resources associated with a second set of transmissions. In some examples, the null tone component 1135 may identify a second location as a second subset of the first set of wireless resources that are configured for transmissions having both a first TTI and a second TTI, and identify the one or more null tones within the second location.

The null tone component 1135 may also identify one or more null tones within OFDM symbols that do not contain the reference signal, identify a first null tone within a first OFDM symbol of a first RB and a second null tone within a second OFDM symbol of a second RB, and identify the one or more null tones further based on at least one of a type of subframe associated with the first set of wireless resources, a MCS of the first set of transmissions, a TBS of the first set of transmissions, or an IMR associated with the first set of wireless resources, or any combination thereof. In some cases, the null tone component may receive signaling indicating the one or more null tones.

Figure 12:
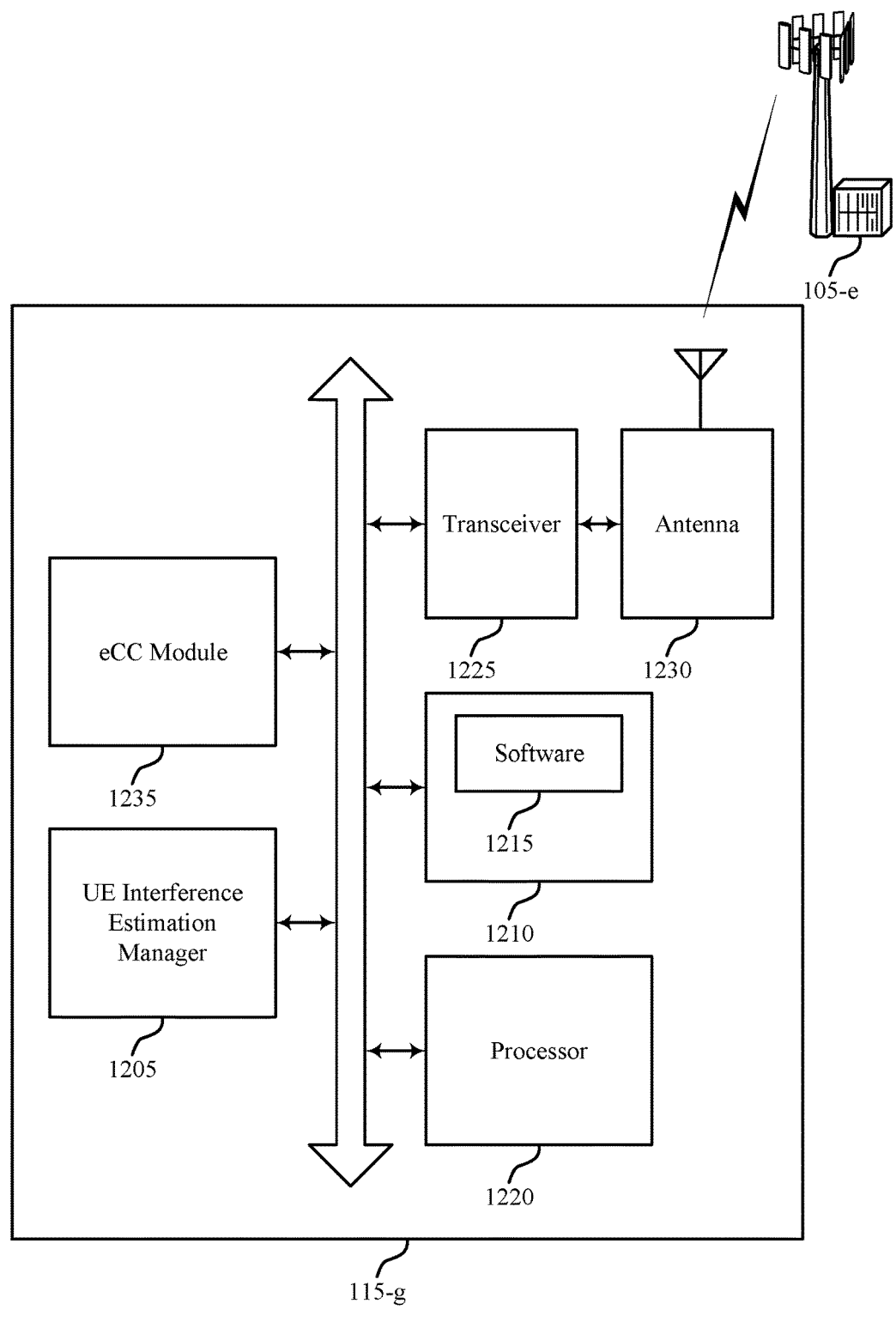
FIG. 12 illustrates a block diagram of a system including a UE that supports noise and interference estimation using multiple TTIs in accordance with various aspects of the present disclosure.

FIG. 12 shows a diagram of a system 1200 including a device that supports noise and interference estimation using multiple TTIs in accordance with various aspects of the present disclosure. For example, system 1200 may include UE 115-g, which may be an example of a wireless device 900, a wireless device 1000, or a UE 115 as described with reference to FIGS. 1, 2, and 8 through 11.

UE 115-g may also include UE interference estimation manager 1205, memory 1210, processor 1220, transceiver 1225, antenna 1230, and eCC module 1235. Each of these modules may communicate, directly or indirectly, with one another (e.g., via one or more buses). The UE interference estimation manager 1205 may be an example of a UE interference estimation manager as described with reference to FIGS. 9 through 11.

The memory 1210 may include random access memory (RAM) and read only memory (ROM). The memory 1210 may store computer-readable, computer-executable software including instructions that, when executed, cause the processor 1220 to perform various functions described herein (e.g., noise and interference estimation using multiple TTIs, etc.). In some cases, the software 1215 may not be directly executable by the processor 1220 but may cause a computer (e.g., when compiled and executed) to perform functions described herein. The processor 1220 may include an intelligent hardware device (e.g., a central processing unit (CPU), a microcontroller, an application specific integrated circuit (ASIC), etc.).

The transceiver 1225 may communicate bi-directionally, via one or more antennas 1230, wired, or wireless links, with one or more networks, as described above. For example, the transceiver 1225 may communicate bi-directionally with a base station 105 (e.g., base station 105-e) or a UE 115. The transceiver 1225 may also include a modem to modulate the packets and provide the modulated packets to the antennas 1230 for transmission, and to demodulate packets received from the antennas 1230. In some cases, the wireless device may include a single antenna 1230. However, in some cases the device may have more than one antenna 1230, which may be capable of concurrently transmitting or receiving multiple wireless transmissions.

The eCC module 1235 may enable operations using eCCs including operations with variable length TTIs and operations in unlicensed spectrum as described above with reference to FIG. 1.

Figure 13:
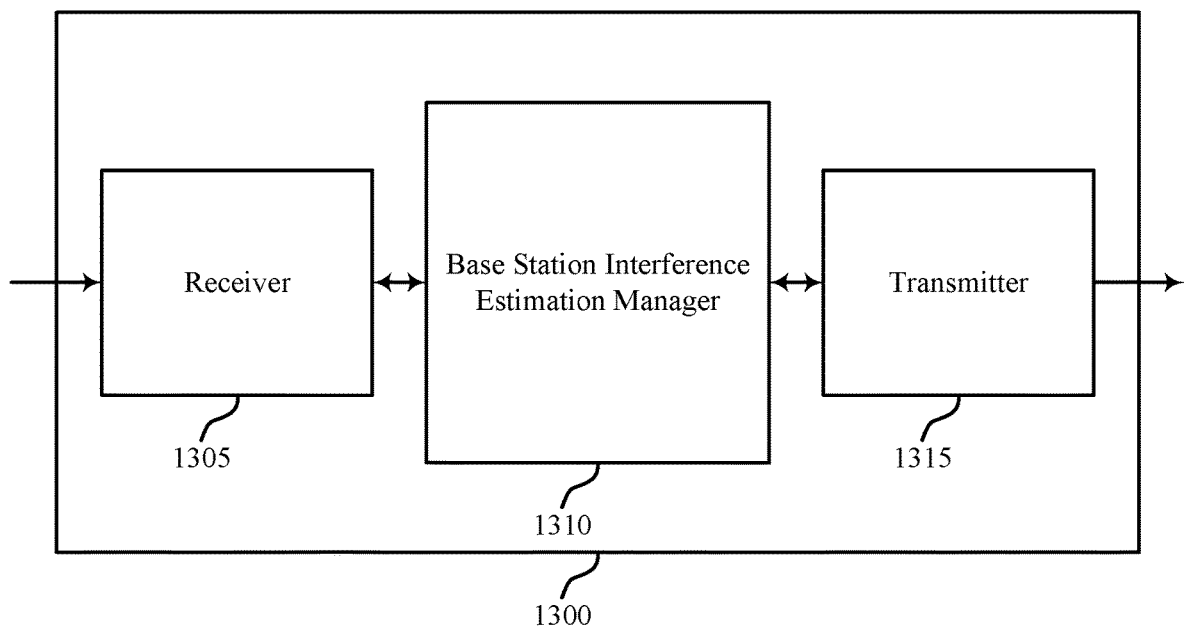
FIGS. 13 through 15 show block diagrams of a wireless device that supports noise and interference estimation using multiple TTIs in accordance with various aspects of the present disclosure.

FIG. 13 shows a block diagram of a wireless device 1300 that supports noise and interference estimation using multiple TTIs in accordance with various aspects of the present disclosure. Wireless device 1300 may be an example of aspects of a base station 105 as described with reference to FIGS. 1, 2, and 8. Wireless device 1300 may include receiver 1305, base station interference estimation manager 1310, and transmitter 1315. Wireless device 1300 may also include a processor. Each of these components may be in communication with each other.

The receiver 1305 may receive information such as packets, user data, or control information associated with various information channels (e.g., control channels, data channels, information related to noise and interference estimation using multiple TTIs, etc.). Information may be passed on to other components of the device. The receiver 1305 may be an example of aspects of the transceiver 1625 as described with reference to FIG. 16.

The base station interference estimation manager 1310 may identify a first TTI for transmission of a first set of transmissions, identify a second TTI for transmission of a second set of transmissions that overlap with at least a portion of OFDM symbols of the first set of transmissions, where the first TTI has a longer duration than the second TTI, and transmit the first set of transmissions using a transmission mode that supports interference estimation of the second set of transmissions for the OFDM symbols of the first set of transmissions.

The base station interference estimation manager 1310 may also identify a first TTI for reception of a first set of transmissions and a second TTI for reception of a second set of transmissions, where the first TTI has a longer duration than the second TTI, configure one or more null tones within one or more OFDM symbols of a first set of wireless resources associated with the first set of transmissions based on a location of the first set of wireless resources relative to a second set of wireless resources associated with the second set of transmissions, and transmit the first set of transmissions using the first set of wireless resources configured with the one or more null tones. The base station interference estimation manager 1310 may also be an example of aspects of the base station interference estimation manager 1605 as described with reference to FIG. 16.

The transmitter 1315 may transmit signals received from other components of wireless device 1300. In some examples, the transmitter 1315 may be collocated with a receiver in a transceiver module. For example, the transmitter 1315 may be an example of aspects of the transceiver 1625 as described with reference to FIG. 16. The transmitter 1315 may include a single antenna, or it may include a plurality of antennas.

Figure 14:
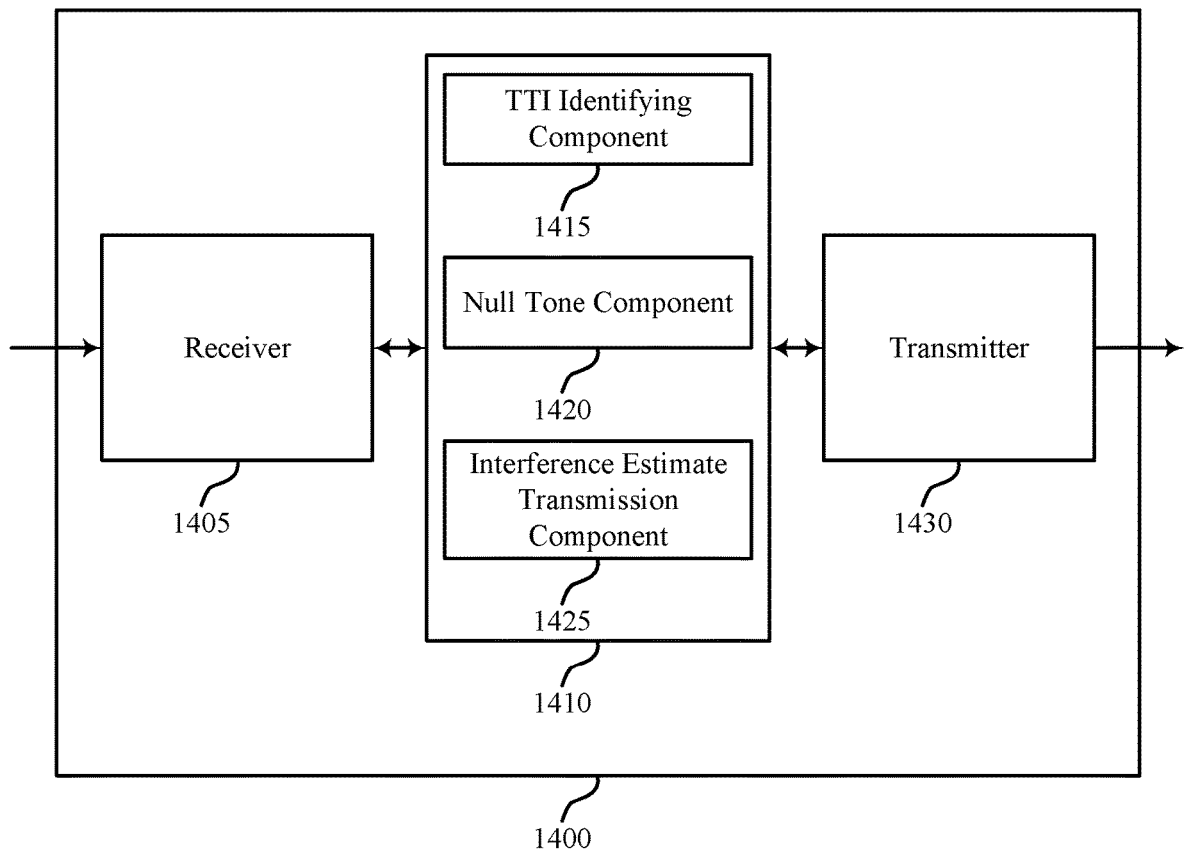

FIG. 14 shows a block diagram of a wireless device 1400 that supports noise and interference estimation using multiple TTIs in accordance with various aspects of the present disclosure. Wireless device 1400 may be an example of aspects of a wireless device 1300 or a base station 105 as described with reference to FIGS. 1, 2, 8, and 13. Wireless device 1400 may include receiver 1405, base station interference estimation manager 1410 and transmitter 1430. Wireless device 1400 may also include a processor. Each of these components may be in communication with each other.

The receiver 1405 may receive information, which may be passed on to other components of the device. The receiver 1405 may also perform the functions described with reference to the receiver 1305 of FIG. 13. The receiver 1405 may be an example of aspects of the transceiver 1625 as described with reference to FIG. 16.

The base station interference estimation manager 1410 may be an example of aspects of base station interference estimation manager 1310 as described with reference to FIG. 13. The base station interference estimation manager 1410 may include TTI identifying component 1415, null tone component 1420 and interference estimate transmission component 1425. The base station interference estimation manager 1410 may be an example of aspects of the base station interference estimation manager 1605 as described with reference to FIG. 16.

The TTI identifying component 1415 may identify a first TTI for transmission of a first set of transmissions, and identify a second TTI for transmission of a second set of transmissions that overlap with at least a portion of OFDM symbols of the first set of transmissions, where the first TTI has a longer duration than the second TTI.

The null tone component 1420 may configure one or more null tones within one or more OFDM symbols of a first set of wireless resources associated with the first set of transmissions based on a location of the first set of wireless resources relative to a second set of wireless resources associated with the second set of transmissions, and transmit the first set of transmissions using the first set of wireless resources configured with the one or more null tones.

The null tone component 1420 may also configure a first null tone within a first OFDM symbol of the first RB and a second null tone within a second OFDM symbol of the second RB, configure the one or more null tones based on at least one of a type of subframe associated with the first set of wireless resources, a MCS of the first set of transmissions, a TBS of the first set of transmissions, or an IMR associated with the first set of wireless resources, or any combination thereof, and transmit signaling indicating the one or more null tones.

In some cases, configuring the one or more null tones further includes configuring the one or more null tones within a subset of the OFDM symbols based on a number of OFDM symbols spanned by the second TTI. In some cases, configuring the one or more null tones further includes configuring the one or more null tones within OFDM symbols that do not contain a reference signal.

In some cases, a reference signal may be configured for transmission in wireless resources, such as a demodulation reference signal (DMRS). In some cases, configuring the one or more null tones further includes configuring a first RB and a second RB within the first set of wireless resources, each of the first RB and second RB including two OFDM symbols that correspond to a duration of the second TTI. In some cases, signaling of the null tones may be provided, where the signaling includes semi-static signaling indicating a configuration of locations of the one or more null tones. In some cases, the signaling includes dynamic signaling indicating a configuration of locations of the one or more null tones.

The interference estimate transmission component 1425 may transmit the first set of transmissions using a transmission mode that supports interference estimation of the second set of transmissions for the OFDM symbols of the first set of transmissions. In some cases, the transmission mode includes a DMRS-based channel estimation transmission mode.

The transmitter 1430 may transmit signals received from other components of wireless device 1400. In some examples, the transmitter 1430 may be collocated with a receiver in a transceiver module. For example, the transmitter 1430 may be an example of aspects of the transceiver 1625 as described with reference to FIG. 16. The transmitter 1430 may utilize a single antenna, or it may utilize a plurality of antennas.

Figure 15:
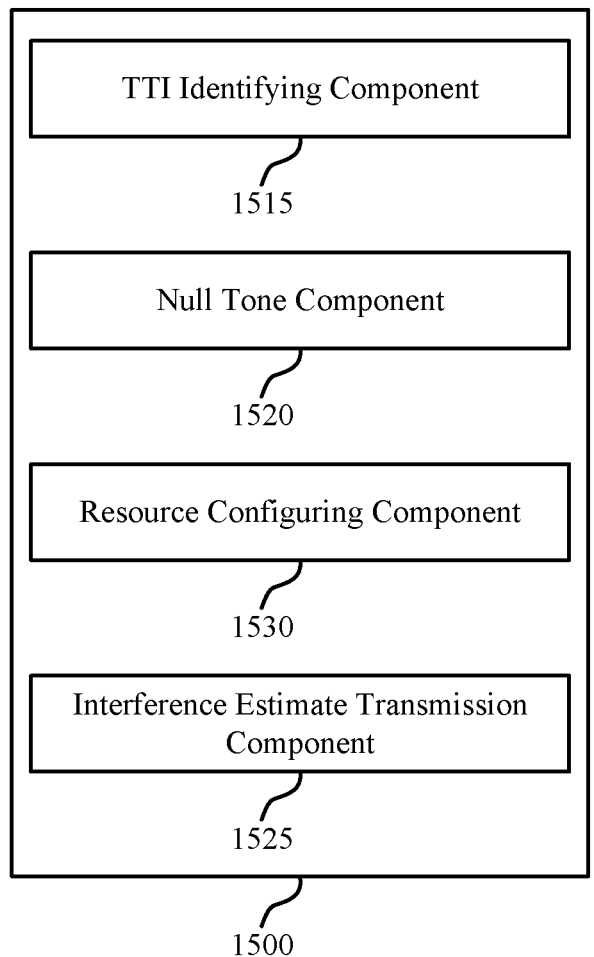

FIG. 15 shows a block diagram of a base station interference estimation manager 1500, which may be an example of the corresponding component of wireless device 1300 or wireless device 1400. That is, base station interference estimation manager 1500 may be an example of aspects of base station interference estimation manager 1310 or base station interference estimation manager 1410 as described with reference to FIGS. 13 and 14. The base station interference estimation manager 1500 may also be an example of aspects of the base station interference estimation manager 1605 as described with reference to FIG. 16.

The base station interference estimation manager 1500 may include TTI identifying component 1515, null tone component 1520, resource configuring component 1530 and interference estimate transmission component 1525. Each of these modules may communicate, directly or indirectly, with one another (e.g., via one or more buses).

The TTI identifying component 1515 may identify a first TTI for transmission of a first set of transmissions, and identify a second TTI for transmission of a second set of transmissions that overlap with at least a portion of OFDM symbols of the first set of transmissions, where the first TTI has a longer duration than the second TTI.

The null tone component 1520 may configure one or more null tones within one or more OFDM symbols of a first set of wireless resources associated with the first set of transmissions based on a location of the first set of wireless resources relative to a second set of wireless resources associated with the second set of transmissions, and transmit the first set of transmissions using the first set of wireless resources configured with the one or more null tones.

The null tone component 1520 may also configure the one or more null tones within a second subset, configure a first null tone within a first OFDM symbol of the first RB and a second null tone within a second OFDM symbol of the second RB, configure the one or more null tones based on at least one of a type of subframe associated with the first set of wireless resources, a MCS of the first set of transmissions, a TBS of the first set of transmissions, or an IMR associated with the first set of wireless resources, or any combination thereof, and transmit signaling indicating the one or more null tones.

The resource configuring component 1530 may configure the second subset of the first set of wireless resources for transmissions having both the first TTI and the second TTI. The interference estimate transmission component 1525 may transmit the first set of transmissions using a transmission mode that supports interference estimation of the second set of transmissions for the OFDM symbols of the first set of transmissions. In some cases, the transmission mode includes a DMRS-based channel estimation transmission mode.

Figure 16:
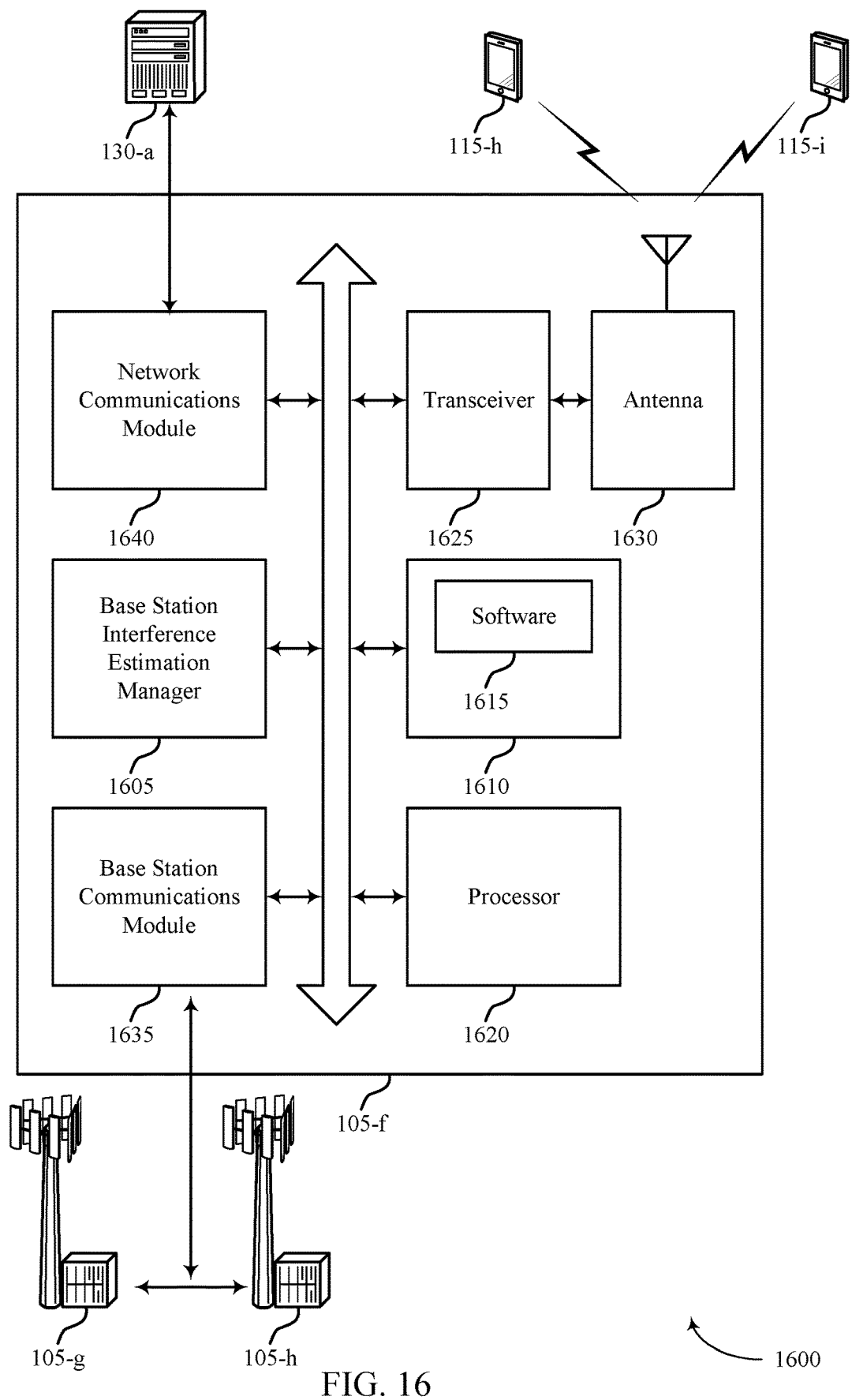
FIG. 16 illustrates a block diagram of a system including a base station that supports noise and interference estimation using multiple TTIs in accordance with various aspects of the present disclosure.

FIG. 16 shows a diagram of a wireless system 1600 including a device that supports noise and interference estimation using multiple TTIs in accordance with various aspects of the present disclosure. For example, system 1600 may include base station 105-*f*, which may be an example of a wireless device 1300, a wireless device 1400, or a base station 105 as described with reference to FIGS. 1, 2, 8, and 13 through 15. Base station 105-*f* may also include components for bi-directional voice and data communications including components for transmitting communications and components for receiving communications. For example, base station 105-*d* may communicate bi-directionally with one or more UEs 115 (e.g., UEs 115-*h* and 115-*i*).

Base station 105-*d* may also include base station interference estimation manager 1605, memory 1610, processor 1620, transceiver 1625, antenna 1630, base station communications module 1635 and network communications module 1640. Each of these modules may communicate, directly or indirectly, with one another (e.g., via one or more buses). The base station interference estimation manager 1605 may be an example of a base station interference estimation manager as described with reference to FIGS. 13 through 15.

The memory 1610 may include RAM and ROM. The memory 1610 may store computer-readable, computer-executable software including instructions that, when executed, cause the processor 1620 to perform various functions described herein (e.g., noise and interference estimation using multiple TTIs, etc.). In some cases, the software 1615 may not be directly executable by the processor 1620 but may cause a computer (e.g., when compiled and executed) to perform functions described herein. The processor 1620 may include an intelligent hardware device (e.g., a CPU, a microcontroller, an ASIC, etc.).

The transceiver 1625 may communicate bi-directionally, via one or more antennas 1630, wired, or wireless links, with one or more networks, as described above. For example, the transceiver 1625 may communicate bi-directionally with a base station 105 or a UE 115. The transceiver 1625 may also include a modem to modulate the packets and provide the modulated packets to the antennas 1630 for transmission, and to demodulate packets received from the antennas 1630. In some cases, the wireless device may include a single antenna 1630. However, in some cases the device may have more than one antenna 1630, which may be capable of concurrently transmitting or receiving multiple wireless transmissions.

The base station communications module 1635 may manage communications with other base station 105 (e.g., base stations 105-g and 105-h), and may include a controller or scheduler for controlling communications with UEs 115 in cooperation with other base stations 105. For example, the base station communications module 1635 may coordinate scheduling for transmissions to UEs 115 for various interference mitigation techniques such as beamforming or joint transmission. In some examples, base station communications module 1635 may provide an X2 interface within a LTE/LTE-A wireless communication network technology to provide communication between base stations 105.

The network communications module 1640 may manage communications with the core network, such as core network 130-a (e.g., via one or more wired backhaul links). For example, the network communications module 1640 may manage the transfer of data communications for client devices, such as one or more UEs 115.

Figure 17:
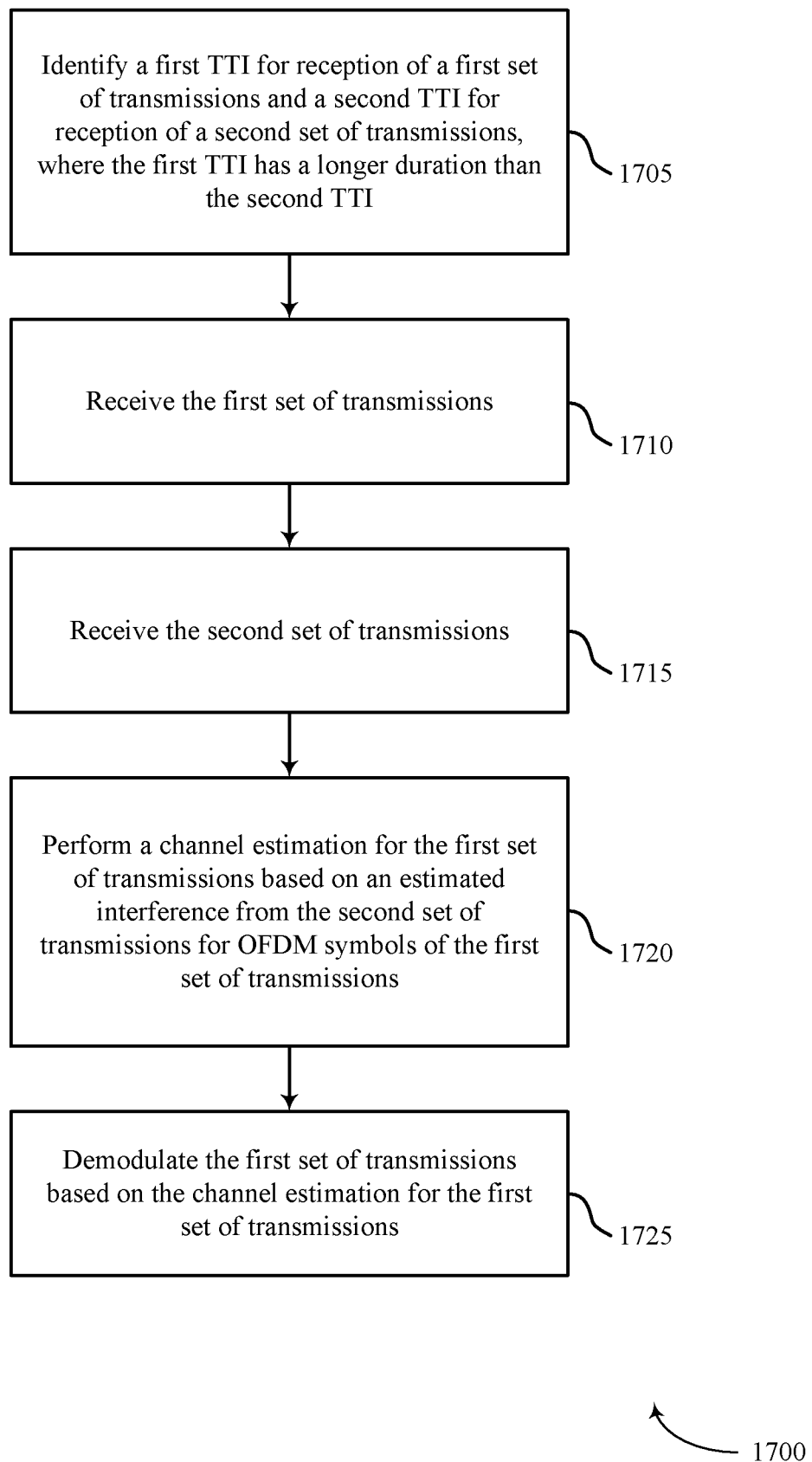
FIGS. 17 through 23 illustrate methods for noise and interference estimation using multiple TTIs in accordance with various aspects of the present disclosure.

FIG. 17 shows a flowchart illustrating a method 1700 for noise and interference estimation using multiple TTIs in accordance with various aspects of the present disclosure. The operations of method 1700 may be implemented by a device such as a UE 115 or its components as described with reference to FIGS. 1, 2, and 8. For example, the operations of method 1700 may be performed by the UE interference estimation manager as described herein. In some examples, the UE 115 may execute a set of codes to control the functional elements of the device to perform the functions described below. Additionally or alternatively, the UE 115 may perform aspects of the functions described below using special-purpose hardware.

At block 1705, the UE 115 may identify a first TTI for reception of a first set of transmissions and a second TTI for reception of a second set of transmissions, where the first TTI has a longer duration than the second TTI as described above with reference to FIGS. 2 through 8. In certain examples, the operations of block 1705 may be performed by the variable TTI reception component as described with reference to FIGS. 10 and 11.

At block 1710, the UE 115 may receive the first set of transmissions as described above with reference to FIGS. 2 through 8. In certain examples, the operations of block 1710 may be performed by the variable TTI reception component as described with reference to FIGS. 10 and 11.

At block 1715, the UE 115 may receive the second set of transmissions as described above with reference to FIGS. 2 through 8. In certain examples, the operations of block 1715 may be performed by the variable TTI reception component as described with reference to FIGS. 10 and 11.

At block 1720, the UE 115 may perform a channel estimation for the first set of transmissions based on an estimated interference from the second set of transmissions for OFDM symbols of the first set of transmissions as described above with reference to FIGS. 2 through 8. In certain examples, the operations of block 1720 may be performed by the channel estimation component as described with reference to FIGS. 10 and 11.

At block 1725, the UE 115 may demodulate the first set of transmissions based on the channel estimation for the first set of transmissions as described above with reference to FIGS. 2 through 8. In certain examples, the operations of block 1725 may be performed by the demodulation component as described with reference to FIGS. 10 and 11.

Figure 18:
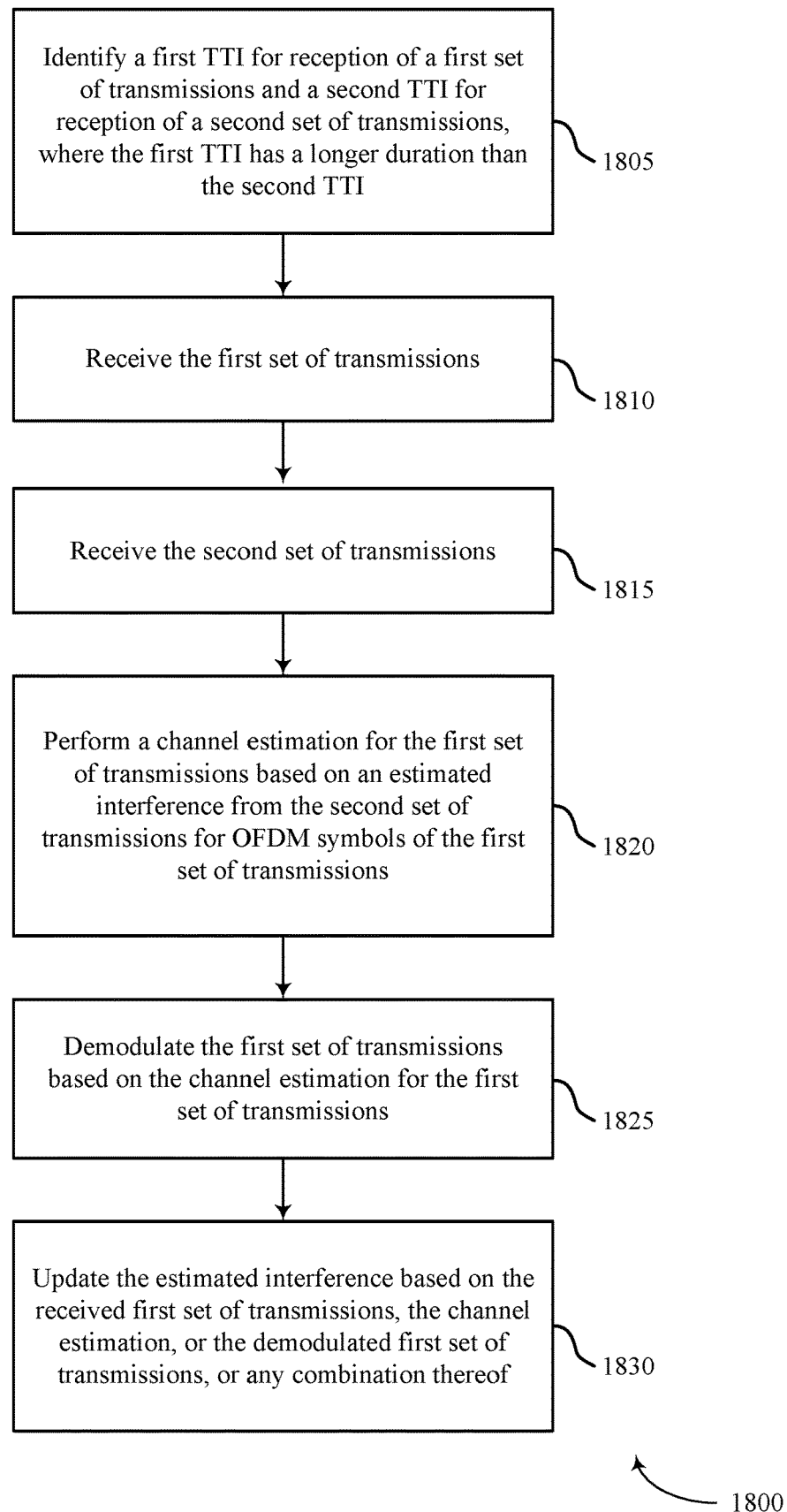

FIG. 18 shows a flowchart illustrating a method 1800 for noise and interference estimation using multiple TTIs in accordance with various aspects of the present disclosure. The operations of method 1800 may be implemented by a device such as a UE 115 or its components as described with reference to FIGS. 1, 2, and 8. For example, the operations of method 1800 may be performed by the UE interference estimation manager as described herein. In some examples, the UE 115 may execute a set of codes to control the functional elements of the device to perform the functions described below. Additionally or alternatively, the UE 115 may perform aspects of the functions described below using special-purpose hardware.

At block 1805, the UE 115 may identify a first TTI for reception of a first set of transmissions and a second TTI for reception of a second set of transmissions, where the first TTI has a longer duration than the second TTI as described above with reference to FIGS. 2 through 8. In certain examples, the operations of block 1805 may be performed by the variable TTI reception component as described with reference to FIGS. 10 and 11.

At block 1810, the UE 115 may receive the first set of transmissions as described above with reference to FIGS. 2 through 8. In certain examples, the operations of block 1810 may be performed by the variable TTI reception component as described with reference to FIGS. 10 and 11.

At block 1815, the UE 115 may receive the second set of transmissions as described above with reference to FIGS. 2 through 8. In certain examples, the operations of block 1815 may be performed by the variable TTI reception component as described with reference to FIGS. 10 and 11.

At block 1820, the UE 115 may perform a channel estimation for the first set of transmissions based on an estimated interference from the second set of transmissions for OFDM symbols of the first set of transmissions as described above with reference to FIGS. 2 through 8. In certain examples, the operations of block 1820 may be performed by the channel estimation component as described with reference to FIGS. 10 and 11.

At block 1825, the UE 115 may demodulate the first set of transmissions based on the channel estimation for the first set of transmissions as described above with reference to FIGS. 2 through 8. In certain examples, the operations of block 1825 may be performed by the demodulation component as described with reference to FIGS. 10 and 11.

At block 1830, the UE 115 may update the estimated interference based on at least one of the received first set of transmissions, the channel estimation, or the demodulated first set of transmissions, or any combination thereof as described above with reference to FIGS. 2 through 8. In certain examples, the operations of block 1830 may be performed by the interference estimation component as described with reference to FIGS. 10 and 11.

Figure 19:
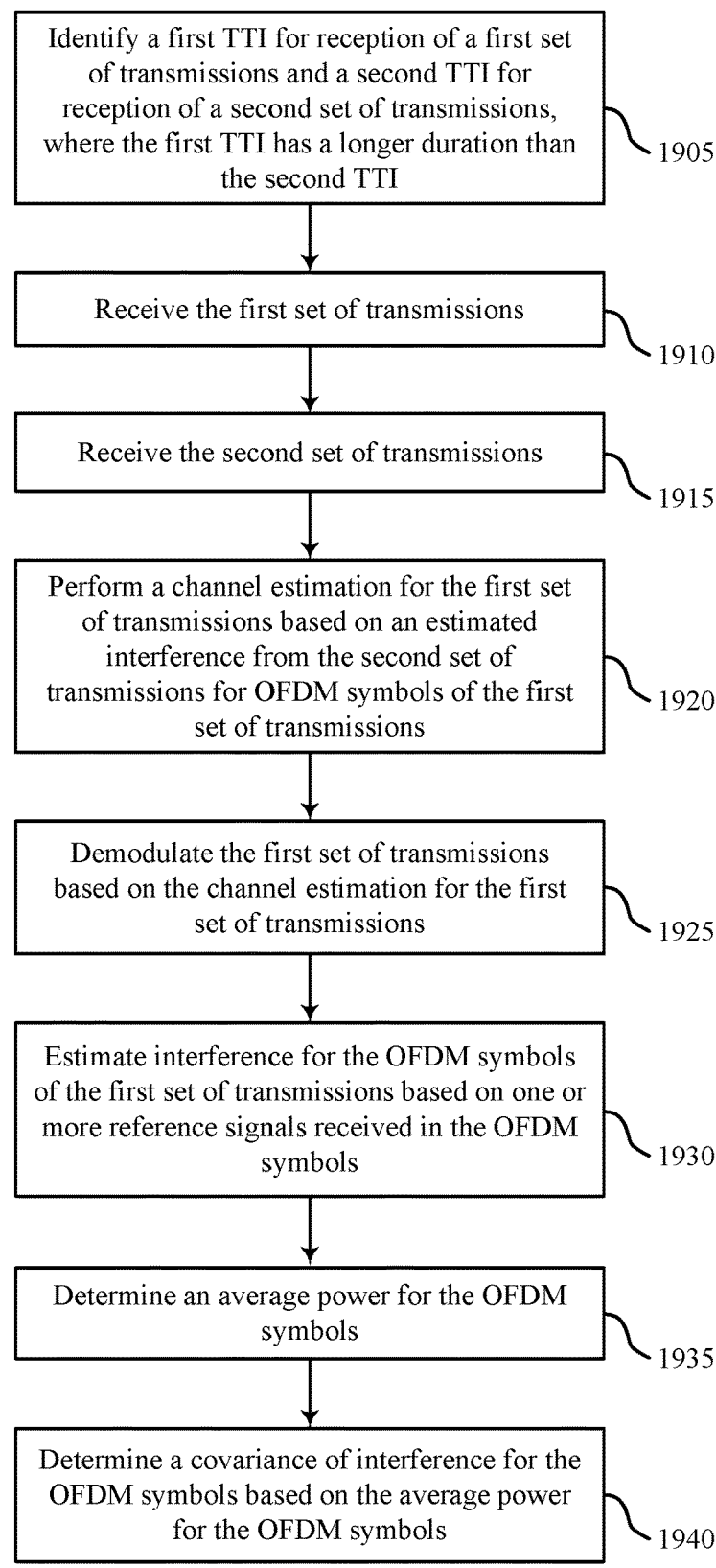

FIG. 19 shows a flowchart illustrating a method 1900 for noise and interference estimation using multiple TTIs in accordance with various aspects of the present disclosure. The operations of method 1900 may be implemented by a device such as a UE 115 or its components as described with reference to FIGS. 1, 2, and 8. For example, the operations of method 1900 may be performed by the UE interference estimation manager as described herein. In some examples, the UE 115 may execute a set of codes to control the functional elements of the device to perform the functions described below. Additionally or alternatively, the UE 115 may perform aspects of the functions described below using special-purpose hardware.

At block 1905, the UE 115 may identify a first TTI for reception of a first set of transmissions and a second TTI for reception of a second set of transmissions, where the first TTI has a longer duration than the second TTI as described above with reference to FIGS. 2 through 8. In certain examples, the operations of block 1905 may be performed by the variable TTI reception component as described with reference to FIGS. 10 and 11.

At block 1910, the UE 115 may receive the first set of transmissions as described above with reference to FIGS. 2 through 8. In certain examples, the operations of block 1910 may be performed by the variable TTI reception component as described with reference to FIGS. 10 and 11.

At block 1915, the UE 115 may receive the second set of transmissions as described above with reference to FIGS. 2 through 8. In certain examples, the operations of block 1915 may be performed by the variable TTI reception component as described with reference to FIGS. 10 and 11.

At block 1920, the UE 115 may perform a channel estimation for the first set of transmissions based on an estimated interference from the second set of transmissions for OFDM symbols of the first set of transmissions as described above with reference to FIGS. 2 through 8. In certain examples, the operations of block 1920 may be performed by the channel estimation component as described with reference to FIGS. 10 and 11.

At block 1925, the UE 115 may demodulate the first set of transmissions based on the channel estimation for the first set of transmissions as described above with reference to FIGS. 2 through 8. In certain examples, the operations of block 1925 may be performed by the demodulation component as described with reference to FIGS. 10 and 11.

At block 1930, the UE 115 may estimate interference for the OFDM symbols of the first set of transmissions based on one or more reference signals received in the OFDM symbols as described above with reference to FIGS. 2 through 8. In certain examples, the operations of block 1930 may be performed by the interference estimation component as described with reference to FIGS. 10 and 11.

At block 1935, the UE 115 may determine an average power for each of the OFDM symbols as described above with reference to FIGS. 2 through 8. In certain examples, the operations of block 1935 may be performed by the interference estimation component as described with reference to FIGS. 10 and 11.

At block 1940, the UE 115 may determine a covariance of interference for the OFDM symbols based on the average power for each of the OFDM symbols as described above with reference to FIGS. 2 through 8. In certain examples, the operations of block 1940 may be performed by the interference estimation component as described with reference to FIGS. 10 and 11.

Figure 20:
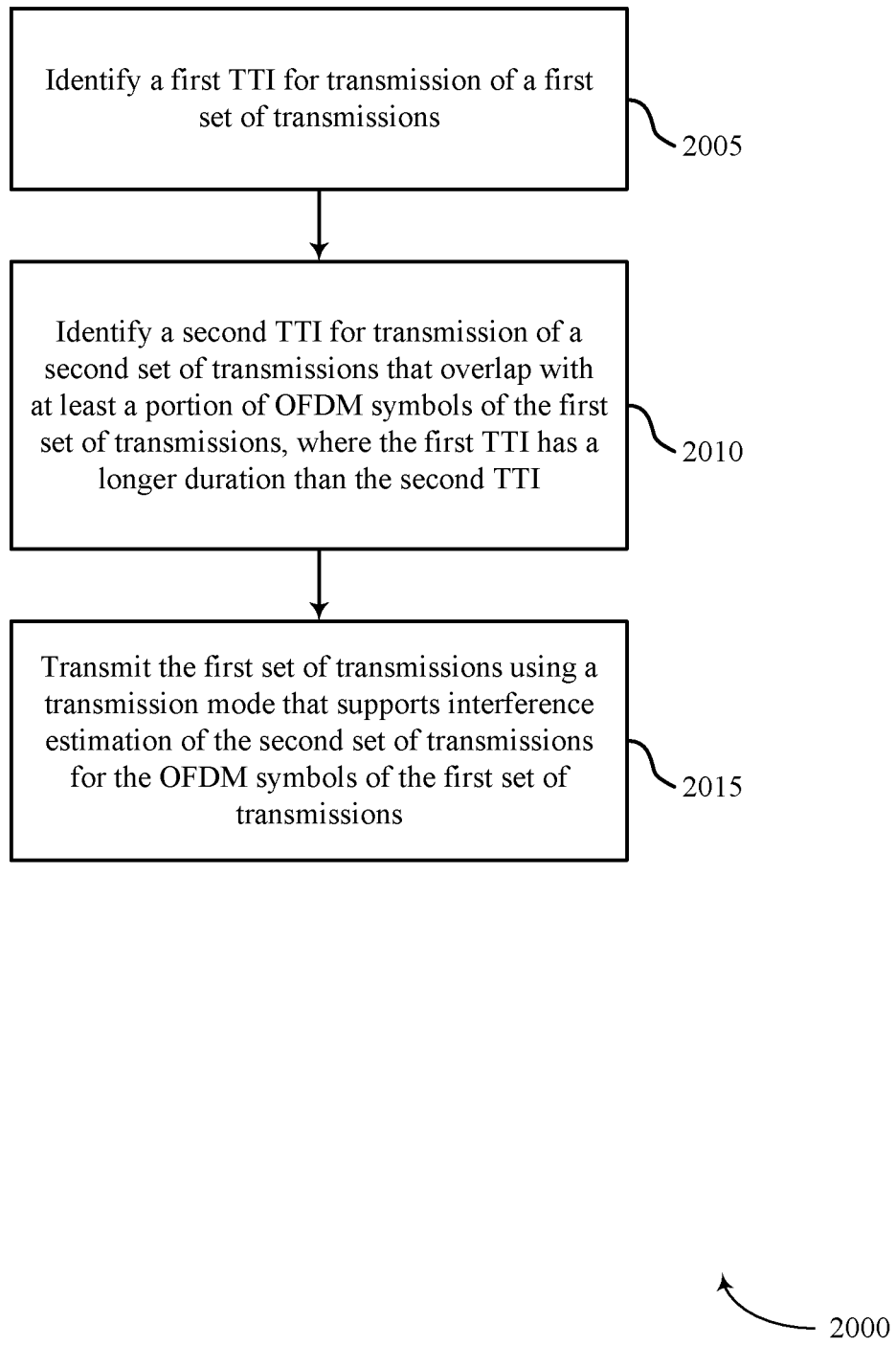

FIG. 20 shows a flowchart illustrating a method 2000 for noise and interference estimation using multiple TTIs in accordance with various aspects of the present disclosure. The operations of method 2000 may be implemented by a device such as a base station 105 or its components as described with reference to FIGS. 1, 2, and 8. For example, the operations of method 2000 may be performed by the base station interference estimation manager as described herein. In some examples, the base station 105 may execute a set of codes to control the functional elements of the device to perform the functions described below. Additionally or alternatively, the base station 105 may perform aspects of the functions described below using special-purpose hardware.

At block 2005, the base station 105 may identify a first TTI for transmission of a first set of transmissions as described above with reference to FIGS. 2 through 8. In certain examples, the operations of block 2005 may be performed by the TTI identifying component as described with reference to FIGS. 14 and 15.

At block 2010, the base station 105 may identify a second TTI for transmission of a second set of transmissions that overlap with at least a portion of OFDM symbols of the first set of transmissions, where the first TTI has a longer duration than the second TTI as described above with reference to FIGS. 2 through 8. In certain examples, the operations of block 2010 may be performed by the TTI identifying component as described with reference to FIGS. 14 and 15.

At block 2015, the base station 105 may transmit the first set of transmissions using a transmission mode that supports interference estimation of the second set of transmissions for the OFDM symbols of the first set of transmissions as described above with reference to FIGS. 2 through 8. In certain examples, the operations of block 2015 may be performed by the interference estimate transmission component as described with reference to FIGS. 14 and 15.

Figure 21:
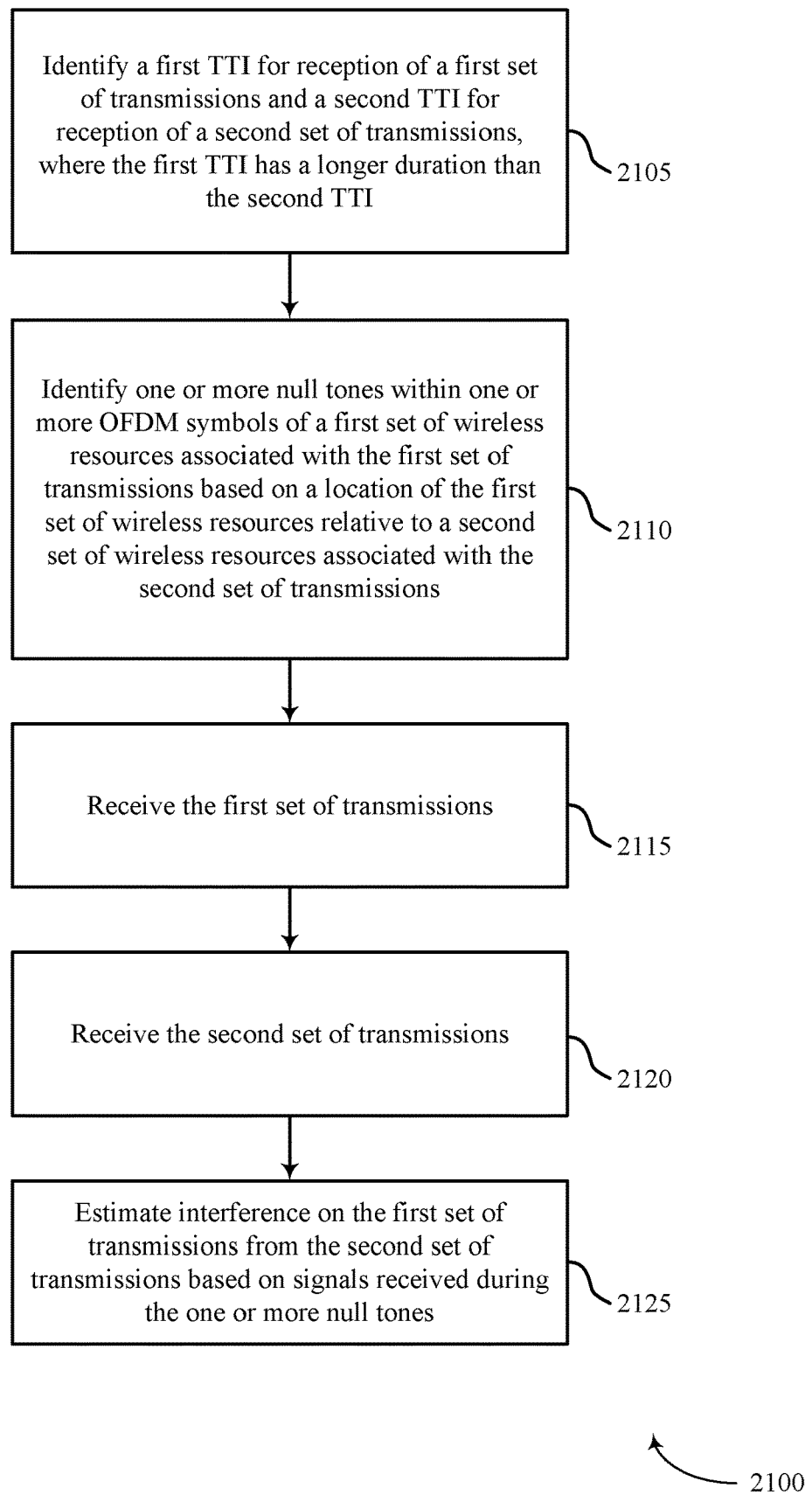

FIG. 21 shows a flowchart illustrating a method 2100 for noise and interference estimation using multiple TTIs in accordance with various aspects of the present disclosure. The operations of method 2100 may be implemented by a device such as a UE 115 or its components as described with reference to FIGS. 1, 2, and 8. For example, the operations of method 2100 may be performed by the UE interference estimation manager as described herein. In some examples, the UE 115 may execute a set of codes to control the functional elements of the device to perform the functions described below. Additionally or alternatively, the UE 115 may perform aspects of the functions described below using special-purpose hardware.

At block 2105, the UE 115 may identify a first TTI for reception of a first set of transmissions and a second TTI for reception of a second set of transmissions, where the first TTI has a longer duration than the second TTI as described above with reference to FIGS. 2 through 8. In certain examples, the operations of block 2105 may be performed by the variable TTI reception component as described with reference to FIGS. 10 and 11.

At block 2110, the UE 115 may identify one or more null tones within one or more OFDM symbols of a first set of wireless resources associated with the first set of transmissions based on a location of the first set of wireless resources relative to a second set of wireless resources associated with the second set of transmissions as described above with reference to FIGS. 2 through 8. In certain examples, the operations of block 2110 may be performed by the null tone component as described with reference to FIGS. 10 and 11.

At block 2115, the UE 115 may receive the first set of transmissions as described above with reference to FIGS. 2 through 8. In certain examples, the operations of block 2115 may be performed by the variable TTI reception component as described with reference to FIGS. 10 and 11.

At block 2120, the UE 115 may receive the second set of transmissions as described above with reference to FIGS. 2 through 8. In certain examples, the operations of block 2120 may be performed by the variable TTI reception component as described with reference to FIGS. 10 and 11.

At block 2125, the UE 115 may estimate interference on the first set of transmissions from the second set of transmissions based on signals received during the one or more null tones as described above with reference to FIGS. 2 through 8. In certain examples, the operations of block 2125 may be performed by the interference estimation component as described with reference to FIGS. 10 and 11.

Figure 22:
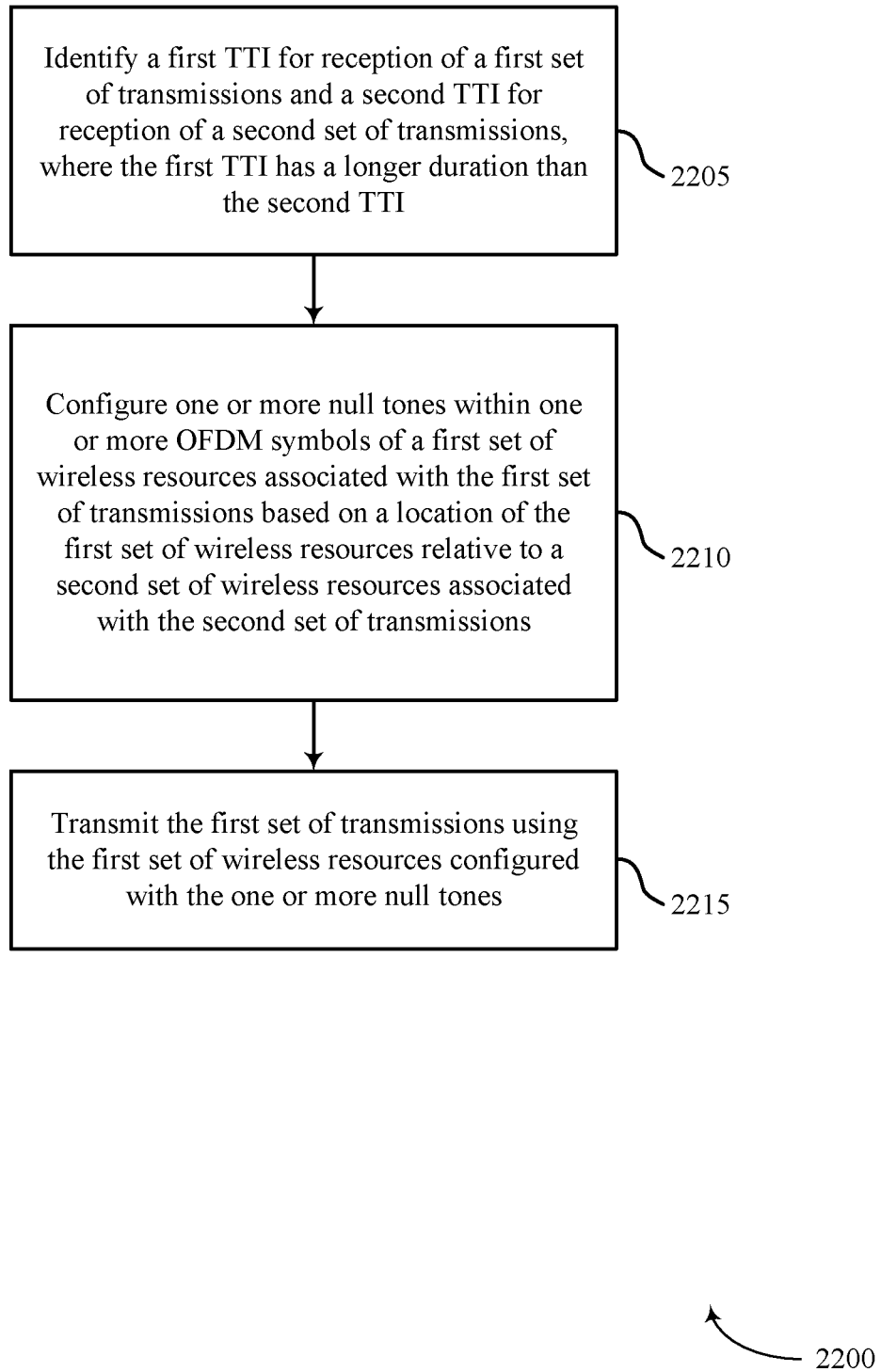

FIG. 22 shows a flowchart illustrating a method 2200 for noise and interference estimation using multiple TTIs in accordance with various aspects of the present disclosure. The operations of method 2200 may be implemented by a device such as a base station 105 or its components as described with reference to FIGS. 1, 2, and 8. For example, the operations of method 2200 may be performed by the base station interference estimation manager as described herein. In some examples, the base station 105 may execute a set of codes to control the functional elements of the device to perform the functions described below. Additionally or alternatively, the base station 105 may perform aspects of the functions described below using special-purpose hardware.

At block 2205, the base station 105 may identify a first TTI for transmission of a first set of transmissions and a second TTI for transmission of a second set of transmissions, where the first TTI has a longer duration than the second TTI as described above with reference to FIGS. 2 through 8. In certain examples, the operations of block 2205 may be performed by the TTI identifying component as described with reference to FIGS. 14 and 15.

At block 2210, the base station 105 may configure one or more null tones within one or more OFDM symbols of a first set of wireless resources associated with the first set of transmissions based on a location of the first set of wireless resources relative to a second set of wireless resources associated with the second set of transmissions as described above with reference to FIGS. 2 through 8. In certain examples, the operations of block 2210 may be performed by the null tone component as described with reference to FIGS. 14 and 15.

At block 2215, the base station 105 may transmit the first set of transmissions using the first set of wireless resources configured with the one or more null tones as described above with reference to FIGS. 2 through 8. In certain examples, the operations of block 2215 may be performed by the null tone component as described with reference to FIGS. 14 and 15.

Figure 23:
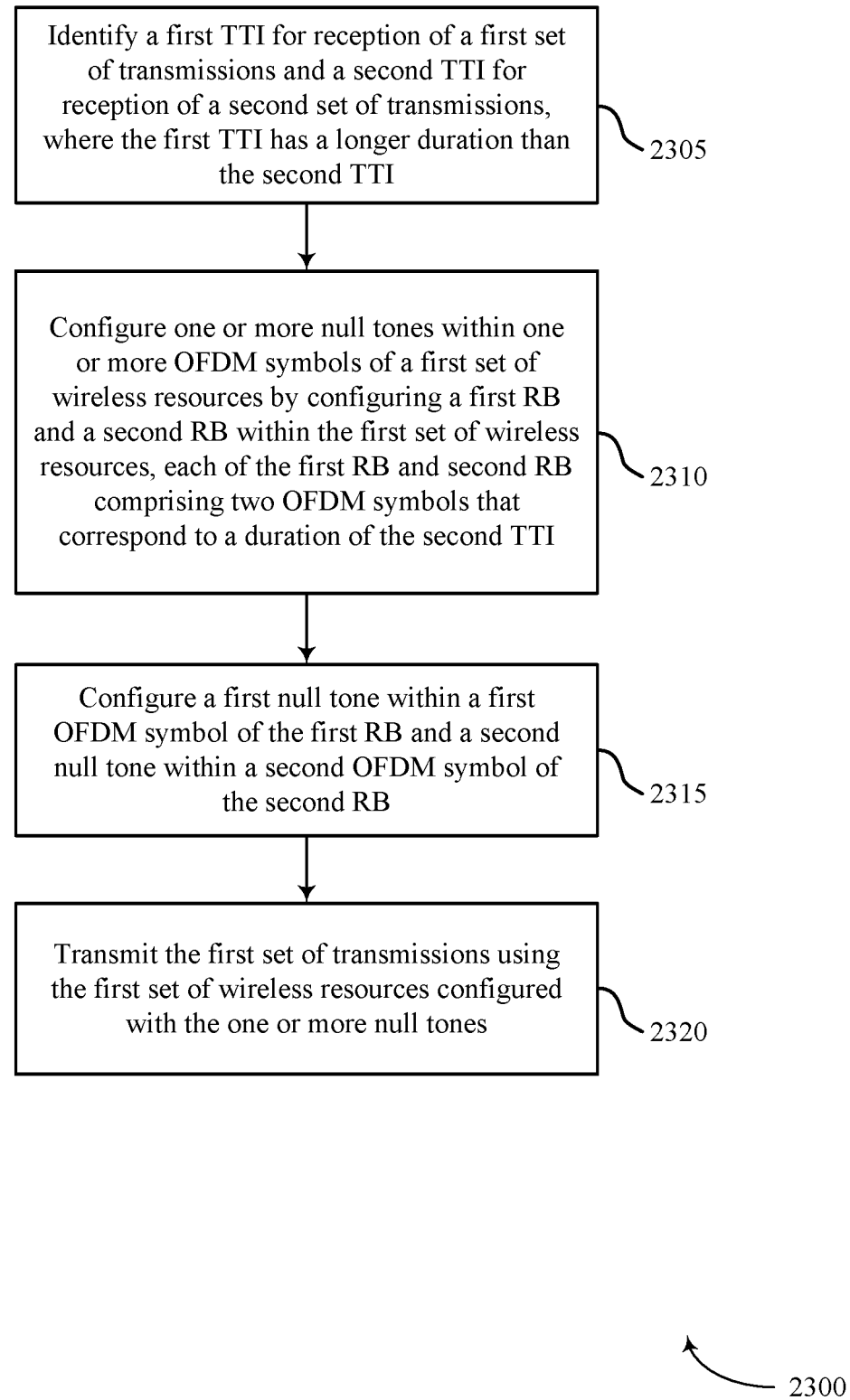

FIG. 23 shows a flowchart illustrating a method 2300 for noise and interference estimation using multiple TTIs in accordance with various aspects of the present disclosure. The operations of method 2300 may be implemented by a device such as a base station 105 or its components as described with reference to FIGS. 1, 2, and 8. For example, the operations of method 2300 may be performed by the base station interference estimation manager as described herein. In some examples, the base station 105 may execute a set of codes to control the functional elements of the device to perform the functions described below. Additionally or alternatively, the base station 105 may perform aspects of the functions described below using special-purpose hardware.

At block 2305, the base station 105 may identify a first TTI for transmission of a first set of transmissions and a second TTI for transmission of a second set of transmissions, where the first TTI has a longer duration than the second TTI as described above with reference to FIGS. 2 through 8. In certain examples, the operations of block 2305 may be performed by the TTI identifying component as described with reference to FIGS. 14 and 15.

At block 2310, the base station 105 may configure one or more null tones within one or more OFDM symbols of a first set of wireless resources associated with the first set of transmissions based on a location of the first set of wireless resources relative to a second set of wireless resources associated with the second set of transmissions as described above with reference to FIGS. 2 through 8. In some cases, configuring the one or more null tones further includes configuring a first RB and a second RB within the first set of wireless resources, each of the first RB and second RB including two OFDM symbols that correspond to a duration of the second TTI. In certain examples, the operations of block 2310 may be performed by the null tone component as described with reference to FIGS. 14 and 15.

At block 2315, the base station 105 may configure a first null tone within a first OFDM symbol of the first RB and a second null tone within a second OFDM symbol of the second RB as described above with reference to FIGS. 2 through 8. In certain examples, the operations of block 2315 may be performed by the null tone component as described with reference to FIGS. 14 and 15.

At block 2320, the base station 105 may transmit the first set of transmissions using the first set of wireless resources configured with the one or more null tones as described above with reference to FIGS. 2 through 8. In certain examples, the operations of block 2320 may be performed by the null tone component as described with reference to FIGS. 14 and 15.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for noise and interference estimation using multiple TTIs.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in at least one of hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using at least one of software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as code division multiple access (CDMA), time division multiple access (TDMA), frequency division multiple access (FDMA), orthogonal frequency division multiple access (OFDMA), single carrier FDMA (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes a LTE system for purposes of example, and LTE terminology is used in much of the description above, although the techniques are applicable beyond LTE applications.

In LTE/LTE-A networks, including networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100, 200-a, and 200-b of FIGS. 1-2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency FDD (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for noise and interference estimation using multiple TTIs. It should be noted that the methods described herein describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with at least one of a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, a FPGA, or another semi-custom IC), which may be programmed in any manner known in the art. The functions of each unit may also be implemented, in whole or in part, with instructions embodied in a memory, formatted to be executed by one or more general or application-specific processors.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication, comprising:
   identifying a first transmission time interval (TTI) for reception of a first set of transmissions and a second TTI for reception of a second set of transmissions, wherein the first TTI has a longer duration than the second TTI, and wherein the second TTI is within the first TTI;
   receiving the first set of transmissions over a first subset of a set of orthogonal frequency division multiplexing (OFDM) symbols, wherein the first set of transmissions comprises one or more reference signal tones;
   receiving the second set of transmissions over a second subset of the set of OFDM symbols, wherein the second subset of the set of OFDM symbols is non-overlapping with the OFDM symbols of the first set of transmissions carrying the one or more reference signal tones;
   estimating interference from caused by the second set of transmissions on each OFDM symbol of the first subset of the set of OFDM symbols of the first set of transmissions, based at least in part on the second set of transmissions being received over the second subset of the set of OFDM symbols that is non-overlapping with the OFDM symbols carrying the one or more reference signal tones;
   iteratively updating the estimated interference on a per-symbol basis;
   performing a channel estimation for the first set of transmissions based at least in part on the estimated interference and the iterative updating; and
   demodulating the first set of transmissions based at least in part on the channel estimation for the first set of transmissions.

2. The method of claim 1, wherein estimating the interference further comprises:
   performing an initial estimate of noise and interference based at least in part on the one or more reference signal tones; and
   iteratively updating the estimated noise and interference on the per-symbol basis, wherein the iterative updating is based at least in part on the initial estimate of noise and interference, the received first set of transmissions, the channel estimation, or the demodulated first set of transmissions, or any combination thereof.

3. The method of claim 1, wherein the one or more reference signal tones comprise a demodulation reference signal (DMRS) tone, a cell-specific reference signal (CRS) tone, or any combination thereof.

4. The method of claim 1, further comprising:
   estimating interference for the first subset of the set of OFDM symbols of the first set of transmissions based at least in part on one or more reference signals received in the one or more reference signal tones.

5. The method of claim 4, further comprising:
   determining an average power for the first subset of the set of OFDM symbols; and
   determining a covariance of interference for the first subset of the set of OFDM symbols based at least in part on the average power for the first subset of the set of OFDM symbols.

6. The method of claim 4, wherein performing the channel estimation further comprises:
   performing a minimum mean squared error (MMSE) channel estimation for the first set of transmissions based at least in part on the estimated interference for the second subset of the set of OFDM symbols and the one or more reference signals received in the one or more reference signal tones.

7. The method of claim 6, wherein the first set of transmissions are demodulated using a MMSE demodulation for the first set of transmissions based at least in part on the MMSE channel estimation for each OFDM symbol of the first subset of the set of OFDM symbols.

8. The method of claim 1, wherein the estimated interference is averaged over two or more resource blocks (RBs) of the first set of transmissions.

9. An apparatus for wireless communication, comprising:
means for identifying a first transmission time interval (TTI) for reception of a first set of transmissions and a second TTI for reception of a second set of transmissions, wherein the first TTI has a longer duration than the second TTI, and wherein the second TTI is within the first TTI;
means for receiving the first set of transmissions over a first subset of a set of orthogonal frequency division multiplexing (OFDM) symbols, wherein the first set of transmissions comprises one or more reference signal tones;
means for receiving the second set of transmissions over a second subset of the set of OFDM symbols, wherein the second subset of the set of OFDM symbols is non-overlapping with the OFDM symbols of the first set of transmissions carrying the one or more reference signal tones;
means for estimating interference from caused by the second set of transmissions on each OFDM symbol of the first subset of the set of OFDM symbols of the first set of transmissions, based at least in part on the second set of transmissions being received over the second subset of the set of OFDM symbols that is non-overlapping with the OFDM symbols carrying the one or more reference signal tones;
means for iteratively updating the estimated interference on a per-symbol basis;
means for performing a channel estimation for the first set of transmissions based at least in part on the estimated interference and the iterative updating; and
means for demodulating the first set of transmissions based at least in part on the channel estimation for the first set of transmissions.

10. The apparatus of claim 9, wherein the means for estimating the interference further comprise:
means for performing an initial estimate of noise and interference based at least in part on the one or more reference signal tones; and
means for iteratively updating the noise and estimated interference on the per-symbol basis, wherein the iterative updating is based at least in part on the initial estimate of noise and interference, the received first set of transmissions, the channel estimation, or the demodulated first set of transmissions, or any combination thereof.

11. The apparatus of claim 9, wherein the one or more reference signal tones comprise a demodulation reference signal (DMRS) tone, a cell-specific reference signal (CRS) tone, or any combination thereof.

12. The apparatus of claim 9, further comprising:
means for estimating interference for the first subset of the set of OFDM symbols of the first set of transmissions based at least in part on one or more reference signals received in the one or more reference signal tones.

13. The apparatus of claim 12, further comprising:
means for determining an average power for the first subset of the set of OFDM symbols; and
means for determining a covariance of interference for the first subset of the set of OFDM symbols based at least in part on the average power for the first subset of the set of OFDM symbols.

14. The apparatus of claim 12, wherein the means for performing the channel estimation further comprise:
means for performing a minimum mean squared error (MMSE) channel estimation for the first set of transmissions based at least in part on the estimated interference for the second subset of the set of OFDM symbols and the one or more reference signals received in the one or more reference signal tones.

15. The apparatus of claim 14, wherein the first set of transmissions are demodulated using a MMSE demodulation for the first set of transmissions based at least in part on the MMSE channel estimation for each OFDM symbol of the first subset of the set of OFDM symbols.

16. The apparatus of claim 9, wherein the estimated interference is averaged over two or more resource blocks (RBs) of the first set of transmissions.

17. An apparatus for wireless communication, in a system comprising:
a processor;
memory in electronic communication with the processor; and
instructions stored in the memory and operable, when executed by the processor, to cause the apparatus to:
identify a first transmission time interval (TTI) for reception of a first set of transmissions and a second TTI for reception of a second set of transmissions, wherein the first TTI has a longer duration than the second TTI, and wherein the second TTI is within the first TTI;
receive the first set of transmissions over a first subset of a set of orthogonal frequency division multiplexing (OFDM) symbols, wherein the first set of transmissions comprises one or more reference signal tones;
receive the second set of transmissions over a second subset of the set of OFDM symbols, wherein the second subset of the set of OFDM symbols is non-overlapping with the OFDM symbols of the first set of transmissions carrying the one or more reference signal tones;
estimate interference caused by the second set of transmissions on each OFDM symbol of the first subset of the set of OFDM symbols of the first set of transmissions, based at least in part on the second set of transmissions being received over the second subset of the set of OFDM symbols that is non-overlapping with the OFDM symbols carrying the one or more reference signal tones;
iteratively update the estimated interference on a per-symbol basis;
perform a channel estimation for the first set of transmissions based at least in part on the estimated interference and the iterative updating; and
demodulate the first set of transmissions based at least in part on the channel estimation for the first set of transmissions.

18. The apparatus of claim 17, wherein the instructions to estimate the interference are further executable by the processor to cause the apparatus to:
perform an initial estimate of noise and interference based at least in part on the one or more reference signal tones; and
iteratively update the estimated noise and interference on the per-symbol basis, wherein the iterative updating is based at least in part on the initial estimate of noise and interference, the received first set of transmissions, the channel estimation, or the demodulated first set of transmissions, or any combination thereof.

19. The apparatus of claim 17, wherein the one or more reference signal tones comprise a demodulation reference signal (DMRS) tone, a cell-specific reference signal (CRS) tone, or any combination thereof.

20. The apparatus of claim 17, wherein the instructions are further executable by the processor to cause the apparatus to:
estimate interference for the first subset of the set of OFDM symbols of the first set of transmissions based at least in part on one or more reference signals received in the one or more reference signal tones.

21. The apparatus of claim 20, wherein the instructions are further executable by the processor to cause the apparatus to:
determine an average power for the first subset of the set of OFDM symbols; and
determine a covariance of interference for the first subset of the set of OFDM symbols based at least in part on the average power for the first subset of the set of OFDM symbols.

22. The apparatus of claim 20, wherein the instructions to perform the channel estimation are further executable by the processor to cause the apparatus to:
perform a minimum mean squared error (MMSE) channel estimation for the first set of transmissions based at least in part on the estimated interference for the second subset of the set of OFDM symbols and the one or more reference signals received in the one or more reference signal tones.

23. The apparatus of claim 22, wherein the first set of transmissions are demodulated using a MMSE demodulation for the first set of transmissions based at least in part on the MMSE channel estimation for each OFDM symbol of the first subset of the set of OFDM symbols.

24. The apparatus of claim 17, wherein the estimated interference is averaged over two or more resource blocks (RBs) of the first set of transmissions.

25. A non-transitory computer-readable medium storing code for wireless communication, the code comprising instructions executable by a processor to:
identify a first transmission time interval (TTI) for reception of a first set of transmissions and a second TTI for reception of a second set of transmissions, wherein the first TTI has a longer duration than the second TTI, and wherein the second TTI is within the first TTI;
receive the first set of transmissions over a first subset of a set of orthogonal frequency division multiplexing (OFDM) symbols, wherein the first set of transmissions comprises one or more reference signal tones;
receive the second set of transmissions over a second subset of the set of OFDM symbols, wherein the second subset of the set of OFDM symbols is non-overlapping with the OFDM symbols of the first set of transmissions carrying the one or more reference signal tones;
estimate interference from caused by the second set of transmissions on each OFDM symbol of the first subset of the set of OFDM symbols of the first set of transmissions, based at least in part on the second set of transmissions being received over the second subset of the set of OFDM symbols that is non-overlapping with the OFDM symbols carrying the one or more reference signal tones;
iteratively update the estimated interference on a per-symbol basis;
perform a channel estimation for the first set of transmissions based at least in part on the estimated interference and the iterative updating; and demodulate the first set of transmission based at least in part on the channel estimation for the first set of transmissions.

26. The non-transitory computer-readable medium of claim 25, wherein the instructions to estimate the interference are further executable by the processor to:
perform an initial estimate of noise and interference based at least in part on the one or more reference signal tones; and
iteratively update the estimated noise and interference on the per-symbol basis, wherein the iterative updating is based at least in part on the initial estimate of noise and interference, the received first set of transmissions, the channel estimation, or the demodulated first set of transmissions, or any combination thereof.

27. The non-transitory computer-readable medium of claim 25, wherein the one or more reference signal tones comprise a demodulation reference signal (DMRS) tone, a cell-specific reference signal (CRS) tone, or any combination thereof.

28. The non-transitory computer-readable medium of claim 25, wherein the instructions are further executable by the processor to:
estimate interference for the first subset of the set of OFDM symbols of the first set of transmissions based at least in part on one or more reference signals received in the one or more reference signal tones.

29. The non-transitory computer-readable medium of claim 28, wherein the instructions are further executable by the processor to:
determine an average power for the first subset of the set of OFDM symbols; and
determine a covariance of interference for the first subset of the set of OFDM symbols based at least in part on the average power for the first subset of the set of OFDM symbols.

30. The non-transitory computer-readable medium of claim 28, wherein the instructions to perform the channel estimation are further executable by the processor to:
perform a minimum mean squared error (MMSE) channel estimation for the first set of transmissions based at least in part on the estimated interference for the second subset of the set of OFDM symbols and the one or more reference signals received in the one or more reference signal tones.

* * * * *